US012499880B1

(12) United States Patent
Gupta et al.

(10) Patent No.: US 12,499,880 B1
(45) Date of Patent: Dec. 16, 2025

(54) VIRTUAL ASSISTANT DIALOG MANAGEMENT

(71) Applicant: Amazon Technologies, Inc., Seattle, WA (US)

(72) Inventors: Prakhar Gupta, Pittsburgh, PA (US); Yang Liu, Los Altos, CA (US); Behnam Hedayatnia, San Francisco, CA (US); Di Jin, Santa Clara, CA (US); Patrick Lueder Lange, Mountain View, CA (US); Sijia Liu, Santa Clara, CA (US); Spandana Gella, Montreal (CA); Julia Bell Hirschberg, New York, NY (US); Dilek Hakkani-Tur, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 18/081,877

(22) Filed: Dec. 15, 2022

(51) Int. Cl.
*G10L 15/22* (2006.01)
*G10L 13/08* (2013.01)
*G10L 15/183* (2013.01)

(52) U.S. Cl.
CPC ............ *G10L 15/183* (2013.01); *G10L 13/08* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2013/0275164 | A1* | 10/2013 | Gruber | G06F 16/2457 705/5 |
| 2015/0340033 | A1* | 11/2015 | Di Fabbrizio | G10L 15/18 704/254 |
| 2017/0132019 | A1* | 5/2017 | Karashchuk | G06F 9/453 |
| 2017/0270929 | A1* | 9/2017 | Aleksic | G10L 15/22 |
| 2018/0115645 | A1* | 4/2018 | Iyer | G06Q 10/063112 |
| 2018/0204107 | A1* | 7/2018 | Tucker | G06F 16/24573 |
| 2019/0266999 | A1* | 8/2019 | Chandrasekaran | G06F 3/167 |
| 2023/0056680 | A1* | 2/2023 | Thomas | G10L 15/065 |
| 2023/0206910 | A1* | 6/2023 | Ershov | G10L 15/16 704/232 |

OTHER PUBLICATIONS

Kushal Arora, et al. 2022. Director: Generator-Classifiers For Supervised Language Modeling. arXiv preprint arXiv:2206.07694v2, 15 pages.

(Continued)

*Primary Examiner* — Seong-Ah A Shin
(74) *Attorney, Agent, or Firm* — Pierce Atwood LLP

(57) ABSTRACT

A dialog management system that coordinates system dialog responses based on natural language guidelines which provide non-deterministic ways for the system to properly respond to a dialog input based on the dialog history/context. For each input, an appropriate guideline is selected by a machine learning component based on the dialog history. The guideline is then sent, along with the dialog history, to a downstream machine learning component to determine an appropriate dialog system response.

20 Claims, 17 Drawing Sheets

(56) References Cited

OTHER PUBLICATIONS

Ashutosh Baheti, et al. 2021. Just Say No: Analyzing the Stance of Neural Dialogue Generation in Offensive Contexts. In Proceedings of the 2021 Conference on Empirical Methods in Natural Language Processing. Association for Computational Linguistics, pp. 4846-4862.
Siqi Bao, et al. 2021. PLATO-2: Towards Building an Open-Domain Chatbot via Curriculum Learning. In Findings of the Association for Computational Linguistics: ACL-IJCNLP, pp. 2513-2525.
Soumya Barikeri, et al. 2021. RedditBias: A Real-World Resource for Bias Evaluation and Debiasing of Conversational Language Models. In Proceedings of the 59th Annual Meeting of the Association for Computational Linguistics and the 11th International Joint Conference on Natural Language Processing (vol. 1: Long Papers), Online, pp. 1941-1955.
Hyung Won Chung, et al. 2022. Scaling Instruction-Finetuned Language Models. arXiv preprint arXiv:2210.11416v4, pp. 1-54.
Sumanth Dathathri, et al. 2020. Plug and Play Language Models: A Simple Approach to Controlled Text Generation. In Proceedings of the 8th International Conference on Learning Representations, pp. 1-34.
Emily Dinan, et al. 2022. SafetyKit: First Aid for Measuring Safety in Open-Domain Conversational Systems. In Proceedings of the 60th Annual Meeting of the Association for Computational Linguistics (vol. 1: Long Papers), pp. 4113-4133.
Emily Dinan, et al. 2021. Anticipating Safety Issues in e2e Conversational ai: Framework and Tooling. arXiv preprint arXiv:2107.03451v3, pp. 1-43.
Emily Dinan, et al. 2020a. Queens are Powerful too: Mitigating Gender Bias in Dialogue Generation. arXiv preprint arXiv:1911.03842v2, 14 pages.
Emily Dinan, et al. 2020b. Queens are Powerful too: Mitigating Gender Bias in Dialogue Generation. In Proceedings of the 2020 Conference on Empirical Methods in Natural Language Processing, pp. 8173-8188, Online. Association for Computational Linguistics.
Jia Chen Gu, et al. 2019. Speaker-Aware BERT for Multi-Turn Response Selection in Retrieval-Based Chatbots. arXiv preprint arXiv:2004.03588v2, 7 pages.
Jia Chen Gu, et al. 2019. Interactive Matching Network for Multi-Turn Response Selection in Retrieval-Based Chatbots. arXiv preprint arXiv:1901.01824v2, 5 pages.
Prakhar Gupta, et al. 2022a. Target-Guided Dialogue Response Generation Using Commonsense and Data Augmentation. In Findings of the Association for Computational Linguistics: NAACL 2022, pp. 1301-1317.
Prakhar Gupta, et al. 2022b. InstrucDial: Improving Zero and Few-shot Generalization in Dialogue through Instruction Tuning. arXiv preprint arXiv:2205.12673v2, 22 pages.
Prakhar Gupta, et al. 2022c. DialFact: A Benchmark for Fact-Checking in Dialogue. In Proceedings of the 60th Annual Meeting of the Association for Computational Linguistics (vol. 1: Long Papers), pp. 3785-3801.
Peter Hase, et al. 2021. Do Language Models Have Beliefs? Methods for Detecting, Updating, and Visualizing Model Beliefs. arXiv preprint arXiv:2111.13654v1, 19 pages.
Pengcheng He, et al. 2020. DeBERTa: Decoding-enhanced BERT with Disentangled Attention. arXiv preprint arXiv:2006.03654v6, pp. 1-23.
Behnam Hedayatnia, et al. 2020. Policy-Driven Neural Response Generation for Knowledge-Grounded. In Proceedings of the 13th International Conference on Natural Language Generation, Association for Computational Linguistics, pp. 412-421.
Vladimir Karpukin, et al. 2020. Dense Passage Retrieval for Open-Domain Question Answering. In Proceedings of the 2020 Conference on Empirical Methods in Natural Language Processing, pp. 6679-6781.

Nitish Shirish Keskar, et al. 2019. CTRL: A Conditional Transformer Language Model for Controllable Generation. arXiv preprint arXiv:1909.05858v2, pp. 1-18.
Hyunwoo Kim, et al. 2022. ProsocialDialog: A Prosocial Backbone for Conversational Agents. arXiv preprint arXiv:2205.12688v2, 25 pages.
Mike Lewis, et al. 2020. BART: Denoising Sequence-to-Sequence Pre-training for Natural Language Generation, Translation, and Comprehension. In Proceedings of the 58th Annual Meeting of the Association for Computational Linguistics, pp. 7871-7880.
Yu Li, et al. 2022. Knowledge-Grounded Dialogue Generation with a Unified Knowledge Representation. In Proceedings of the 2022 Conference of the North American Chapter of the Association for Computational Linguistics: Human Language Technologies, pp. 206-218.
Alisa Liu, et al. 2021. DEXPERTS: Decoding-Time Controlled Text Generation with Experts and Anti-Experts. In Proceedings of the 59th Annual Meeting of the Association for Computational Linguistics and the 11th International Joint Conference on Natural Language Processing, pp. 6691-6706.
Bing Liu, et al. 2020. Lifelong Knowledge Learning in Rule-based Dialogue Systems. arXiv preprint arXiv:2011.09811, pp. 1-5.
Yinhan Liu, et al. 2019. RoBERTa: A Robustly Optimized BERT Pretraining Approach. arXiv preprint arXiv:1907.11692v1, 13 pages.
Ryan Lowe, et al. 2017. Training End-To-End Dialogue Systems with the Ubuntu Dialogue Corpus. Dialogue & Discourse, vol. 8, No. 1, pp. 31-65.
Aman Madaam, et al. 2022. MemPrompt: Memory-assisted Promp Editing with User Feedback. arXiv preprint arXiv:2201.06009v6, 29 pages.
R. Thomas McCoy, et al. 2019. Right for the Wrong Reasons: Diagnosing Syntactic Heuristics in Natural Language Inference. In Proceedings of the 57th Annual Meeting of the Association for Computational Linguistics, pp. 3428-3448.
Susan W. McRoy, et al. 2003. An augmented template-based approach to text realization. Natural Language Engineering, vol. 9, No. 4, pp. 381-420. Retrieved from https://www.researchgate.net/publication/232010557_An_augmented_template-based_approach_to_text_realization/download.
Kevin Meng, et al. 2022. Locating and Editing Factual Associations in GPT. arXiv preprint arXiv:2202.05262v4, pp. 1-35.
Fei Mi, et al. 2022. CINS: Comprehensive Instruction for Few-shot Learning in Task-oriented Dialog Systems. arXiv preprint arXiv:2109.04645v4, 15 pages.
Eric Mitchell, et al. 2022. Fast Model Editing at Scale. arXiv preprint arXiv:2110.11309v2, pp. 1-21.
Helen Ngo, et al. 2021. Mitigating harm in language models with conditional-likelihood filtration. arXiv preprint arXiv:2108.07790v3, 12 pages.
Yixin Nie, et al. 2021. I like fish, especially dolphins: Addressing Contradictions in Dialogue Modeling. In Proceedings of the 59th Annual Meeting of the Association for Computational Linguistics and the 11th International Joint Conference on Natural Language Processing, pp. 1699-1713.
Tong Niu, et al. 2018. Polite Dialogue GenerationWithout Parallel Data. Transactios of the Association for Computational Linguistics, vol. 6, pp. 373-389.
Colin Raffel, et al. 2020. Exploring the Limits of Transfer Learning with a Unified Text-to-Text Transformer. Journal of Machine Learning Research, vol. 21, pp. 1-67.
Ramya Ramakrishnan, et al. 2022. Long-term Control for Dialogue Generation: Methods and Evaluation. In Proceedings of the 2022 Conference of the North American Chapter of the Association for Computational Linguistics: Human Language Technologies, pp. 738-753.
Ehud Reiter, et al. 2005. Choosing words in computer generated weather forecasts. Artificial Intelligence, vol. 167, pp. 137-169. Retrieved from https://www.sciencedirect.com/science/article/pii/S0004370205000998.
Stephen Roller, et al. 2021. Recipes for Building an Open-Domain Chatbot. In Proceedings of the 16th Conference of the European Chapter of the Association for Computational Linguistics, pp. 300-325.

(56) References Cited

OTHER PUBLICATIONS

Ananya B. Sai, et al. 2020. Improving disalog evaluation with a multi-reference adversarial dataset and large scale pretraining. Transactions of the Association for Computational Linguistics, vol. 8, pp. 810-827. Retrieved from https://direct.mit.edu/tacl/article/doi/10.1162/tacl_a_00347/96477/Improving-Dialog-Evaluation-with-a-Multi-reference.

Jérémy Scheurer, et al. 2022. Training Language Models with Language Feedback. arXiv preprint arXiv:2204.14146v4, 12 pages.

Anton Sinitsin, et al. 2020. Editable Neural Networks. arXiv preprint arXiv:2004.00345v2, pp. 1-12.

Eric Michael Smith, et al. 2020. Can You Put it All Together: Evaluating Conversational Agents' Ability to Blend Skills. In Proceedings of the 58th Annual Meeting of the Association for Computational Linguistics, pp. 2021-2030.

Haoyu Song, et al. 2019. Exploiting Persona Information for Diverse Generation of Conversational Responses. In Proceedings of the Twenty-Eighth International Joint Conference on Artificial Intelligence (IJCAI-19), pp. 5190-5196.

D. Suendermann et al. 2009. From Rule-Based to Statistical Grammars: Continuous Improvement of Large-Scale Spoken Dialog Systems. In 2009 IEEE International Conference on Acoustics, Speech and Signal Processing, pp. 5190-5196. Retrieved from https://www.cs.brandeis.edu/~cs115/CS115_docs/From_rule-based_to_statistical_SpeechCycle.pdf.

Yajing Sun, et al. 2020. History-Adaption Knowledge Incorporation Mechanism for Multi-Turn Dialogue System. The Thirty-Fourth AAAI Conference on Artificial Intelligence (AAAI-20), pp. 8894-8951. Retrieved from https://ojs.aaai.org/index.php/AAAI/article/view/6425.

Aarne Talman, et al. 2019. Testing the Generalization Power of Neural Network Models across NLI Benchmarks. In Proceedings of the 2019 ACL Workshop BlackboxNLP: Analyzing and Interpreting Neural Networks for NLP, pp. 85-94.

Jianheng Tang, et al. 2019. Target-guided open-domain conversation. In Proceedings of the 57th Annual Meeting of the Association for Computational Linguistics, pp. 5624-5634.

Megan Ung, et al. 2022. SaFeRDialogues: Taking Feedback Gracefully after Conversational Safety Failures. In Proceedings of the 60th Annual Meeting of the Association for Computational Linguistics, vol. 1: Long Papers, pp. 6462-6481.

Di Wang, et al. 2017. Steering Output Style and Topic in Neural Response Generation. In Proceedings of the 2017 Conference on Empirical Methods in Natural Language Processing, pp. 2140-2150. Association for Computational Linguistics.

Sean Welleck, et al. 2019. Dialogue Natural Language Inference. In Proceedings of the 57th Annual Meeting of the Association for Computational Linguistics, pp. 3731-3741.

Yu Wu, et al. 2019. A Sequential Matching Framework for Multi-Turn Response Selection in Retrieval-Based Chatbots. Computational Linguistics, vol. 45, No. 1, pp. 163-197. Retrieved from https://direct.mit.edu/coli/article/45/1/163/1615/A-Sequential-Matching-Framework-for-Multi-Turn.

Jing Xu, et al. 2021. Recipes for Safety in Open-domain Chatbots. arXiv preprint arXiv:2010.07079v3, 28 pages.

Chunyuan Yuan, et al. 2019. Multi-hop Selector Network for Multi-turn Response Selection in Retrieval-based Chatbots. In Proceedings of the 2019 Conference on Empirical Methods in Natural Language Processing and the 9th International Joint Conference on Natural Language Processing, pp. 111-120. Association for Computational Linguistics.

Laura Zeidler, et al. 2022. A Dynamic, Interpreted CheckList for Meaning-oriented NLG Metric Evaluation—through the Lens of Semantic Similarity Rating. In Proceedings of the 11th Joint Conference on Lexical and Computational Semantics, pp. 157-172. Association for Computational Linguistics.

Chen Zhang, et al. 2021. Adapting to Context-Aware Knowledge in Natural Conversation for Multi-Turn Response Selection. In Proceedings of the Web Conference 2021, WWW'.21, pp. 1990-2001.

Susan Zhang, et al. 2022. OPT: Open Pre-trained Transformer Language Models. arXiv preprint arXiv:2205.01068v4, 30 pages.

Yizhe Zhang, et al. 2020. DIALOGPT : Large-Scale Generative Pre-training for Conversational Response Generation. In Proceedings of the 58th Annual Meeting of the Association for Computational Linguistics: System Demonstrations, pp. 270-278, Online.

Xueliang Zhao, et al. 2020. Knowledge-Grounded Dialogue Generation with Pre-trained Language Models. In Proceedings of the 2020 Conference on Empirical Methods in Natural Language Processing (EMNLP), pp. 3377-3390, Online. Association for Computational Linguistics.

Peixiang Zhong, et al. 2019. An Affect-Rich Neural Conversational Model with Biased Attention andWeighted Cross-Entropy Loss. In Proceedings the Thirty-Third AAAI Conference on Artificial Intelligence (AAAI-19), pp. 7492-7500. Retrieved from https://ojs.aaai.org/index.php/AAAI/article/view/4740/4618.

Xiang Zhou, et al. 2020. Towards Robustifying NLI Models Against Lexical Dataset Biases. In Proceedings of the 58th Annual Meeting of the Association for Computational Linguistics, pp. 8759-8771, Online.

* cited by examiner

320

```
Conversation:

Speaker X:  Lots of bass and northern.  Loads of fun.  Do you fish?
Speaker Y:  No!  I have never fished, but would love to someday.
Speaker X:  You should come out to the lake with my family!
Speaker Y:  I would love to if I have the time.
Speaker X:  My family owns the lake so we could go up whenever you're free.

Select (yes or no) if the condition is relevant to the last statement of the
conversation:
```

322
324
326

328

| Guideline | Relevant | |
|---|---|---|
| If someone talks about going out on the lake and waterskiing | ○ Yes | ○ No |
| If a person invites you somewhere | ○ Yes | ○ No |
| When someone talks about their lake plans | ○ Yes | ○ No |
| If someone compliments you on the lake | ○ Yes | ○ No |
| When someone invites you to the lake | ○ Yes | ○ No |
| If someone asks what you do on the lake | ○ Yes | ○ No |
| If someone talks about how they vacation at Lake Michigan | ○ Yes | ○ No |

FIG. 3C

Conversation:

Speaker X: I like to exercise. Do you?
Speaker Y: Not really. I just never got into it.

Here are some options for a follow up response to the conversation:

1: You should try it. It sometimes takes a while to develop a routine.
2: Why not? Did you not enjoy it? Or was it hard to find the time?
3: Maybe you just haven't found an exercise you enjoy.
4: Have you tried exercising with a friend? It might be easier to stick with it if you exercise with someone you know.

The guideline is: If someone tells you they do not like to exercise, ask them why.

Select responses that follow or match the guideline:

1 ☐
2 ☐
3 ☐
4 ☐
None ☐

FIG. 3D

Conversation:

Speaker X: I like to exercise. Do you?
Speaker Y: Not really. I just never got into it.

The response follows the guideline: *If someone tells you they do not like to exercise, ask them why.* ⎬ 342 ⌒ 344

The selected response is: Why not? Did you not enjoy it? Or was it hard to find the time? ⌒ 346

Write a corrupted version of the response:
⌒ 348

[Write a corrupted version of the response that contains words from the guideline and original response but does not follow the guidline.]

FIG. 3E

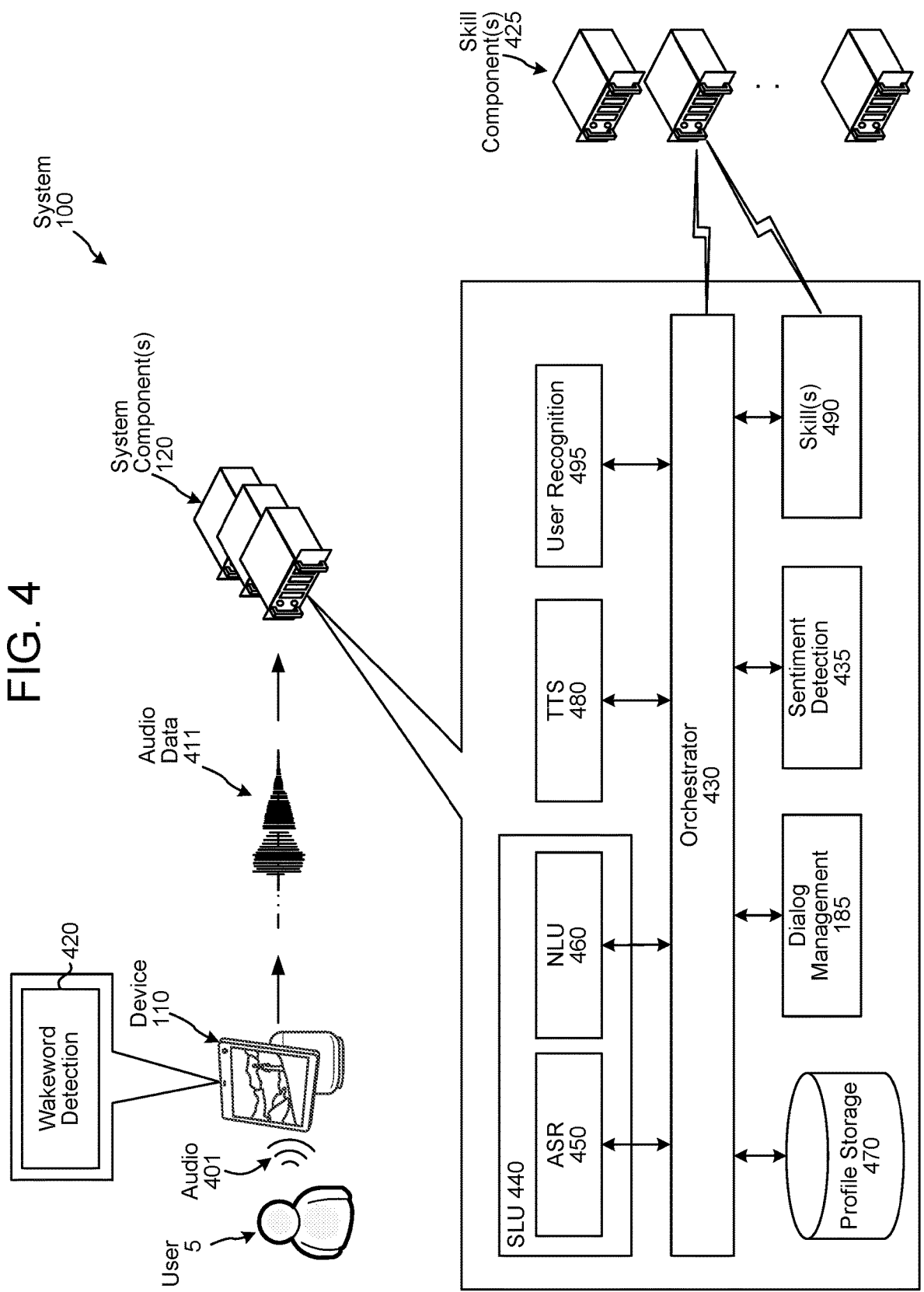

VIRTUAL ASSISTANT DIALOG MANAGEMENT

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A-3E illustrate example data gathering for purposes of training components for use in dialog response determination, in accordance with some embodiments of the present disclosure;

FIG. 4 is a conceptual diagram of components of the system shown in FIGS. 1A and 1B, according to some embodiments of the present disclosure;

DETAILED DESCRIPTION

Figure 1A:
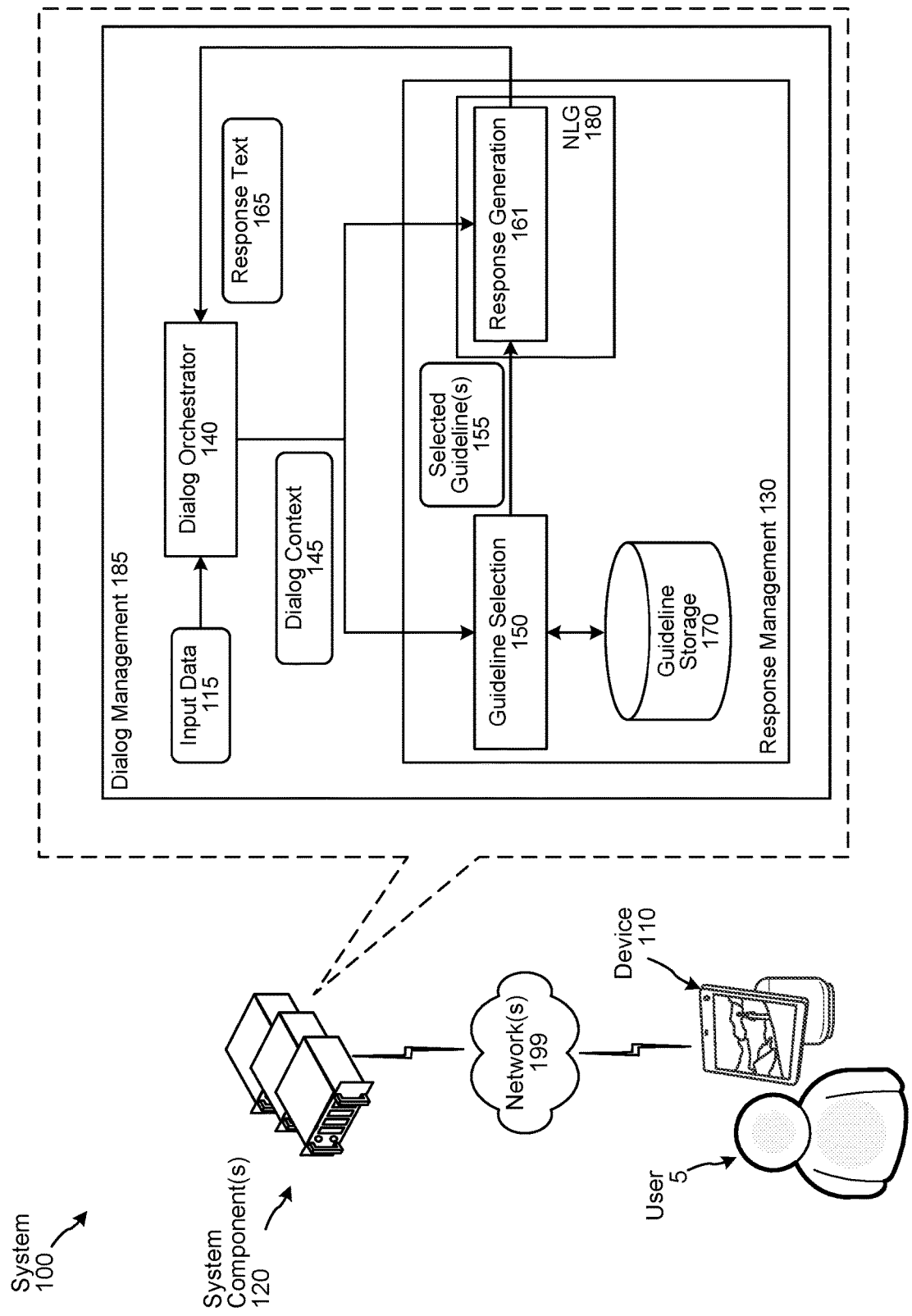
FIG. 1A illustrates example system components configured to use dialog category data to generate a potential dialog response, in accordance with some embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech. Natural language generation (NLG) is a field of computer science concerning generation of text from structured data, where the text represents meaningful phrases and sentences in a natural language form.

Dialog processing, as used herein, is a field of computer science that involves communication between a computing system and a human via text, audio, and/or other forms of communication. While some dialog processing may be more transactional, e.g., involving generation of a response given only a most recent input from a user (i.e., single-turn dialog), more complicated dialog processing can involve determining and optionally acting on one or more goals expressed by the user over multiple turns of dialog, such as making a restaurant reservation, booking an airline ticket, or simple having a conversation about a topic (e.g., current events, something in the news, something in history, content, etc.). Such multi-turn "goal-oriented" dialog systems can be configured to recognize, retain, and use information collected during more than one natural language inputs/outputs during a back-and-forth or other type of "multi-turn" interaction with the user.

The system may thus be configured to respond to the user across multiple exchanges between the user and the system. For example, the user may say to the system "Book a hair salon appointment" and the system may respond "which hair salon would you like to visit?" The user may respond "something nearby" and the system may respond "okay, [hair salon] is 10 minutes away?" The user may also say to the system "show me handbags to purchase," and the system may respond with "what colors are you interested in?" The user may respond "red and blue" and the system may respond with images of red and blue handbags and related purchase information. Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system. A user input and performance by the system of a corresponding action, responsive to the user input, may be referred to as a dialog "turn."

A dialog may be goal-oriented, meaning the dialog is directed to the system performing a specific action requested by a user (such as figuring out what music the system should play, what reservation to make, what piece of content to select, etc.). Alternatively, a dialog may not be goal-oriented, for example as part of a freeform conversation between the system and a user that may not have a definite end point or action in mind at the end of the conversation. System components that control what actions the system takes in response to various user inputs of a dialog may be referred to as dialog management components. This type of technology can be implemented to provide improved functionality for systems sometimes colloquially be referred to as chatbots.

Described herein is the result of significant research and innovation that has been conducted to configure computing components to function in a more human-like a manner when engaging in a user dialog, whether such a dialog is goal-oriented or not. Computing components, such as dialog management components, may be configured to take input data representing user inputs and to process them to select an appropriate response to complete the turn. A dialog management component may process data from other components of a natural language/speech processing system (such as ASR, NLU, etc.) and may send data to other components of a natural language/speech processing system (e.g., TTS). A dialog management component may also process data from, or include overlapping functionality with, components of a natural language/speech processing system (e.g., a NLG components that generates text for a system response of a dialog).

Given the large number of potential interactions, such as dialogs, between a user device and a system, the system may configure multiple dialog management components to each manage a dialog with regard to a specific category of interactions (e.g., a dialog management component for shopping, another for music, yet another for travel), sometimes referred to as a domain. Thus, a system may include multiple, domain-specific dialog management components. If a user input invokes one such domain, e.g., as determined from some aspect of the input (e.g., intent classification, location of interaction, metadata associated with source of the interaction, etc.), the system may route data related to that input to domain-specific components, such as a dialog management component, which may perform processing related to the dialog that may result.

In other embodiments, a specific software application (sometimes referred to as a skill in the context of a voice controlled computing system) may have its own component(s) for managing a dialog/generating system response(s). For example, a particular car ride skill may be capable of involving only a limited number of inputs and responses as part of a dialog with that skill (e.g., responses involving ride booking/coordination) and so thus may use specific internal components to generate system responses to a user input. (Such as system response may include text data that is sent from a skill to a TTS component for output to a user using components such as those discussed below in reference to FIGS. 4 and 5.) This arrangement allows a skill to customize its dialog interactions with a user without having to worry about how a user may interact with other components of a system. A system may include many such skills that are capable of generating their own dialog system responses whether those skills be task specific skills (e.g., booking a ride, playing music, obtaining weather information) or more general (e.g., a chatbot skill).

In some embodiments, with a limited number of dialog permutations to account for, such a skill-specific component may make use of rules or other deterministic components that simply react to a specific input in the same way (or maybe in a limited number of ways). For example, a rule that says if the user says X respond with A, B, or C. Configuring a component using such techniques for limited dialog permutations may be simpler than configuring a component to handle more complex dialogs (e.g., dialogs that change subject matter or the like). Further, such an approach may be easier to update than one involving a centralized dialog management component. Such stratified dialog management components offer the benefit of being able to customize a user's interactions for specific skill-related interactions but have certain drawbacks as well such as requiring individual skill developers to construct their own components to handle dialogs, being overly rigid/limited in the number of dialogs that may be managed, etc.

Use and configuration of a centralized dialog management component may offer its own benefits, such as being able to handle dialogs across subject matter/domains and involving many different skills, offering configurable "personalities" for use by a system when managing a dialog, etc. Such a dialog management approach may use components trained using machine learning (ML) techniques, thus allowing the system to avoid relying exclusively on deterministic approaches such as rules or the like (though rules may also be used to complement a machine learning approach).

Offered is a system that may use a divided approach to dialog management, and specifically system response selection/generation. The system may operate a dialog management component that incorporates guidelines, which correspond to natural language instructions for how a system is to respond in a dialog depending on the context of the dialog. The system may receive input guidelines from many different sources and may store them as part of dialog management component(s). During runtime, as the system engages in a dialog with a user device and is selecting a system response to a user input, the system may process data representing the context of the dialog (e.g., the previous dialog history of user inputs and previous system responses for the dialog) to select a particular guideline to be applied with respect to determination of the next system response. The system may then use the selected guidelines, and the dialog context data, to generate the system response and/or to select from among available dialog responses that may have been generated by another component (e.g., output by a skill, generated by an NLG component, etc.). The system components that perform these operations may include ML trained component(s) that are configured to operate using the guidelines. Centralized (e.g., domain agnostic) dialog components may thus be configured to use guidelines (which themselves may be domain/skill specific if so configured) to manage dialogs across many different subject areas/skills by invoking the appropriate guidelines to determine system dialog responses. This approach allows for improving individual components in a manner that reduces the number of adjustments to other dialog management component(s), thereby requiring less computing resources to retrain/reconfigure a single component. As used herein, determining a system dialog response may include generating such a response and/or selecting such a response from available potential responses.

A system according to the present disclosure may be configured to incorporate user permissions and may only perform activities disclosed herein if approved by a user. As such, the systems, devices, components, and techniques described herein may be configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1B:
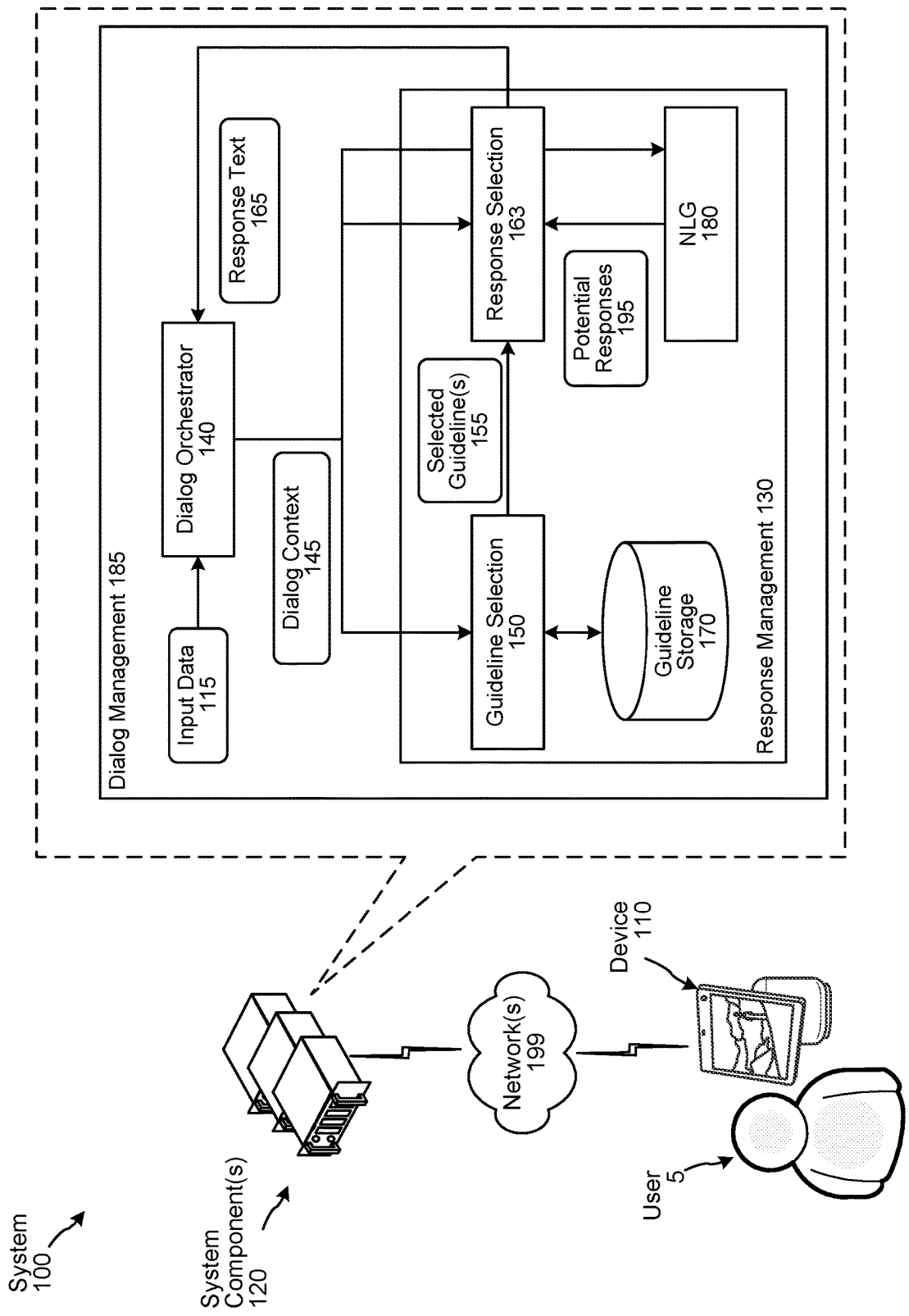
FIG. 1B illustrates example system components configured to use dialog category data to select a potential dialog response, in accordance with some embodiments of the present disclosure.

FIGS. 1A and 1B show an example system 100 configured to determine a dialog response using configurable guidelines. In particular, as illustrated, the system 100 may include, among other components, a dialog management component 185 that includes a response management component 130 that itself includes guideline storage 170, a guideline selection component 150, a response generation 161 component, and a natural language generation (NLG) component 180. As shown in FIG. 1A, the response generation component 161 may generate a response as part of a NLG component 180. As shown in FIG. 1B, the response selection component 163 may select from among potential responses 195 generated by the NLG 180 or by some other component.

As illustrated in FIGS. 1A and 1B, in some implementations, the system 100 may further include a device 110 (e.g., local to a user 5) and system component(s) 120 (e.g., remote from the user 5), with the device 110 being in communication with the system component(s) 120 across one or more networks 199. The network(s) 199 may include the Internet and/or any other wide- or local-area network, and may include wired, wireless, and/or cellular network hardware. While the user 5 is illustrated as a human, it should be appreciated that the present disclosure is not limited thereto, and that the user 5 may be a non-human, such as an application/skill, bot, or the like. Further, it should be understood that although the illustrated example shows the response management component 130 as included within the system component(s) 120, some or all of the functionality of the dialog management component 185 may additionally or alternatively be implemented elsewhere in the system 100, such as within the device 110.

The device 110 may receive audio of a spoken natural language input from the user 5. The device 110 may generate audio data corresponding to the audio, and may send that audio data to the system component(s) 120. The system component(s) 120 may receive the audio data corresponding to the spoken natural language input, and may perform ASR and NLU processing (as described below) on the audio data to determine an appropriate response. In some circumstances, the system component(s) 120 may generate responsive text data and perform text-to-speech processing on that text data to generate audio data. The system component(s) 120 may then send the generated audio data to the device 110 to cause the device 110 to output an audio response to the user 5. Interactions between the device 110 and system component(s) 120 may also be textual based, such as the user inputting text into device 110 and the device 110 sending the text to the system component(s) 120 and receiving output text (or other output data, such as display data) in return.

In connection with such exchanges, the system component(s) 120 may engage in a dialog with the user device 110 which may involve multiple user inputs and corresponding system-generated responses. Determination of a particular system response to a user input may involve operation of the system components illustrated in FIG. 1A. A user may speak an audio input to the device 110. The audio data may be sent by the device 110 to one or more speech processing components (such as ASR and/or NLU as described below in reference to FIGS. 4 and 5). The speech processing components may determine input data 115 representing the user's audio input. The input data 115 may include text data, token data, or other data representing the user input. The user may also provide an input through a different mechanism, for instance pressing a virtual button on a screen of device 110 where the button corresponds to certain text, typing text into the device 110, or the like. In such an instance the input data 115 may represent the text of the user's non-spoken input. The system 100 may then perform processing to determine a response to the input data 115.

As shown, system component(s) 120 may include a dialog management component 185. The dialog management component 185 is configured to manage dialog interactions between device 110 (in the form of user inputs) and system component(s) 120 (in the form of system responses thereto). As noted, user inputs may be received as textual inputs, audio inputs, gesture inputs or the like. Data representing a user input (e.g., input data 115) may be sent to the dialog management component 185 for processing to determine the appropriate system response to output. System responses to user inputs may include responsive communications to the user (in the form of text, synthesized speech, other output indicators, or the like), executable instructions to a device (such as instructions for a light bulb to turn on in response to a user command to do so), other responses, and/or a combination thereof (for example an instruction to a device to perform an action along with a communication to a user indicating the action is to be performed). Inputs/responses may also be in the form of a conversation, such as a chatbot conversation, without necessarily relating to a specific goal.

The dialog management component 185 may include a variety of components such as a dialog orchestrator component 140 and a response management component 130. The dialog orchestrator component 140 may be configured to coordinate the transmission of data between components of the dialog management component 185. The response management component 130 may process data regarding an incoming user input as well as other data to determine an appropriate system response as part of a turn of the ongoing dialog. As shown in FIGS. 1A and 1B, the response management component 130 may include a number of components that may make use of one or more dialog guidelines as discussed herein.

Guidelines may be stored in guideline storage 170 and retrieved by a guideline selection component 150 that may comprise a machine learning classifier configured to select the most appropriate guideline to respond to the current user input. Selection of the appropriate guideline may be based on dialog context data 145, which may represent the context of the ongoing dialog. The dialog context data 145 may include dialog history data which may include user inputs/system responses that have occurred thusfar in the dialog (which may include the current user input, e.g., input data 115). The dialog context data 145 may also include other data.

As shown in FIG. 1A, the response generation component 161 may be included within the NLG 180 such that the response generation component 161 is configured to process the dialog context data 145 and the selected guideline(s) 155 to actually generate the desired system dialog response/response data 165. The response generation component 161 receives the dialog context data 145 as well as the selected guideline(s) 155. The response generation component 161 processes the dialog context data 145 and the selected guideline(s) 155 using one or more ML trained component(s) to determine text of a system response to input data 115. The response generation component 161 may include a language generation ML model that selects the words in a manner consistent with selected guideline(s) 155 based on what has happened thusfar in the dialog, represented by dialog history data included in the dialog context data 145.

As can be appreciated, the response generation component 161 may be configured in a number of ways. For example, the response generation component 161 may comprise a sequence-to-sequence model, transformer, or other neural network with varying architectures depending on system configuration.

In another embodiment, shown in FIG. 1B, a number of potential responses 195 to the current user input 115 may be determined by the NLG 180 (or other component, such as a skill discussed below), which may determine the potential responses 195 based on the dialog context data 145 and/or other data. The selected guideline(s) 155 may be sent to a response selection component 163, which may include one or more ML trained component(s) (such as a classifier or the like) to process the dialog context data 145 and selected guideline(s) 155 to select from among the potential responses 195 determined by the NLG 180. The individual potential response (or responses if there are several) may be selected by the response selection component 163 and text thereof, called the response text 165, may be returned to the dialog orchestrator component 140 for output to downstream components (e.g., a TTS component or the like) for output to device 110 and the user 5. In this configuration the response selection component 163 may select from the available dialog management component 185 to determine the desired system dialog response, represented by response data 165.

The embodiments of FIG. 1A and FIG. 1B may coexist within the system 100, such that the response generation component 161 may include at least one ML model configured to select from among dialog management component 185 based on dialog context data 145 selected guideline(s) 155 and the response selection component 163 may include at least one ML model configured to actually generate a desired system response based on dialog context data 145 and the selected guideline(s) 155. In certain configurations a single ML model may be configured to handle both response selection and response generation. In certain configurations the response selection operations of the response selection component 163 may consider both potential responses 195 generated by the separate NLG 180 as well as one or more potential dialog system response generated by the response generation component 161 when selecting the dialog system response to output as response data 165.

A specific guideline may include a natural language description of how the system 100 is to respond to a particular user input given a particular dialog context. A guideline may take a number of forms such as an "if x" condition, which specifies the context for which the guideline is relevant, and a "then y" action that indicates what should be performed in response to the particular context. Unless hard coded rules, however, because these guidelines will be processed by a ML component to determine a system dialog response, the response determination will follow the guideline without necessarily being deterministic as to the specific text of the response to be output. For example, a guideline may include a natural language statement such as "if a person asks about hobbies say you enjoy reading" or "if a person asks about music say you enjoy jazz," etc. Guidelines can take many forms and can be used by different developers as a control mechanism to drive system responses toward a particular conversation, create more engaging responses, and otherwise configure dialog interactions based on specified dialog context conditions. In one example, a guideline may take the form of one that prompts the system to provide the user with additional information; in another example a guideline may take the form of one that prompts the system to ask the user a question; etc. As can be appreciated, there can be many examples of guidelines and guideline types. Data representing the natural language guidelines are stored in guideline storage 170.

The guideline storage 170 may store many different natural language guidelines related to many potential dialog contexts. A guideline may be specific to a domain, a skill, a conversation category, etc. The conditional portion of the guideline may specify that it should be applied in any number of potential circumstances/contexts depending on the configuration of the guideline. For example, a conditional portion of a guideline may indicate that it is applicable when a specific keyphrase is used, when a user expresses a particular emotion/sentiment, when the dialog engages in a topic in a particular way, when a user is involved in a dialog with a component associated with a specific skill ID, etc. A conditional portion of a guideline may involve data from other sources. For example, a guideline may specify that it should be applied only if a user expresses a particular sentiment. Thus the dialog context data 145 may include sentiment data (for example, from sentiment detection component 435/535 discussed below). In another example, a guideline may specify that if a user from Ohio asks "what is your favorite sport" the system should respond with "football" while if a user from New York asks "what is your favorite sport" the system should respond with "baseball." A user's location (for example as specified in profile storage 470/570 may indicate the user's location which may be reflected in dialog context data 145. Thus the guideline selection component 150 may apply the appropriate guideline based on such other context data as well.

Guidelines may be received from many different source devices such as those associated with skill developers, affinity groups, organizations, companies, etc. The system 100 may provide an interface through which an input device may provide a guideline so that it may be stored in guideline storage 170.

The action portion of a natural language guideline is similarly configurable. It may result in specific actions being performed by a device (e.g., controlling an appliance, activating a device output or function) or a specific type of responses being generated by the system 100 in response to a particular user input. A dialog response may involve a query to another component of system 100. For example, if a guideline specifies "respond with a weather report" the system 100 may query a component associated with a weather skill to obtain weather information for purposes of crafting a dialog response. Thus the system may be configured to obtain information from other sources for purposes of determining response data 165.

Unlike dialog rules, however, a natural language guideline may not necessarily be prescriptive with its response. Thus a guideline may include language such as <If a user seems sad, ask them why they are sad>, which includes a general action description (e.g., "ask them why they are sad") rather than a rule which may specify exact language to be output to a user, such as <If a user says "I am sad" respond with "why are you feeling that way?">. Because the response generation component 161 and response selection component 163 comprise ML models, they are configured to be capable of processing the natural language of a guideline to allow for multiple potential dialog responses based on the action portion of the guideline. Thus, an action portion such as "ask them why they are sad" may result in a number of different dialog responses (in the form of response data 165) that satisfy the guideline and yet may be textually different from each other. The guidelines thus differ from rules or templates which include one or more pre-specified responses that a system is to select from. The present system, through the use of ML components that are trained with respect to the guidelines, allows the system to determine the appropriate language of a response in a more free-form way.

During an ongoing dialog, the system 100 may update the dialog context data 145 of the dialog (e.g., update the dialog history data) and the dialog management component 185 may use the appropriate guideline based on the dialog context data 145 to determine the appropriate response to the user input. Thus, to alter how the system 100 responds to a particular user input in view of a particular dialog context, the entire dialog model need not be adjusted, rather a simple adjustment to the appropriate guideline will be sufficient to change the behavior of the 185. As guidelines can be edited, added, and/or removed (for example by updating the data within guideline storage 170) without changing the underlying model of response determination (e.g., response generation component 161 or response selection component 163), it is possible to adjust how the system 100 reacts to certain dialog contexts more easily, simply by changing a guideline. This may avoid the problem of needing new large dialog training sets (with accompanying labeled training data, etc.) every time a dialog component is to be adjusted, for example to incorporate new conversation protocols or the like. Changing the appropriate guideline(s) will result in updated system behavior (e.g., generating desired system responses for particular dialog subjects/context) without full retraining of components such as the response determination component (e.g., response generation component 161 or response selection component 163).

As the dialog context data 145 is an input to both guideline selection component 150 and response generation component 161/response selection component 163, it can be appreciated that both guideline selection and response determination depend upon the dialog context data 145. The dialog context data 145 may include textual representations of the particular ongoing dialog as represented in dialog history data. Thus the dialog history data within the dialog context data 145 may include may include the text of each prior turn of the user and the corresponding system response and/or a selected number of turns of the user and the corresponding system response. The dialog context data 145 may also include the natural language input data 115 representing the text of the current user input. The dialog history data included in the dialog context data 145 may include dialog portions related to the specific dialog session between device 110 and component(s) 120. For example, all dialog portions associated with the specific dialog session ID for the dialog session between device 110 and component(s) 120 may be included in the dialog context data 145. In other configurations, the dialog context data 145 may only include a certain number of previous dialog turns (for example the last 5 turns, 10 turns, etc.) as depending on system settings. As can be appreciated, the dialog context data 145 may change for each turn of the dialog as the dialog continues. Thus, in turn X of the dialog the system may consider one set of dialog context data 145 to determine a system response for turn X while in turn X+1 the system may consider an updated set of dialog context data 145*a* system response for turn X+1. (As can be appreciated, in certain configurations the dialog context data 145 for turn X+1 may be the same as that for turn X only with the system response for turn X added in.)

In certain circumstances the system 100 may be capable on tracking dialogs related to a particular user 5 even if taking place over multiple devices. For example, a user 5 may participate in a dialog using one device 110 (for example, the device shown in FIG. 1A) and then may switch to a different device (e.g., a smart phone 110*b* such as that shown in FIG. 11) to have a dialog with the system. The system 100 may determine that the original dialog is continuing when the user switches devices and thus may associated both sets of dialog exchanges with the same session ID. Alternatively (or in addition), the system 100 may assign both sets of dialog exchanges their own respective dialog session ID but may associate them with the same user profile of user 5 (e.g., as indicated in profile storage 470/570 discussed below). Thus, in certain circumstances the dialog context data 145 may include dialog text from multiple dialog sessions corresponding to different dialog session IDs. Though such dialog session IDs may be associated with a same user ID/user profile. In certain circumstances the system 100 may determine that an ongoing dialog relates to a previous dialog and may thus retrieve information about the previous dialog to include in the next turn's worth of dialog context data 145.

The guideline selection component 150 comprises one or more ML components, for example a neural network, that is configured to process dialog context data 145 and select one or more appropriate guidelines (e.g., from guideline storage 170) that are appropriate to be applied to determine a response to natural language input data 115. The guideline selection component 150 may be configured to process the dialog context data 145 (e.g., past number of turns of dialog) to determine which available guideline(s) are applicable. The guideline selection component 150 may be configured to score guidelines, where certain guidelines receive a respective score indicating how relevant that particular guideline is to the particular dialog context data 145 processed by the guideline selection component 150. The top scoring guideline(s) may be included in the guideline(s) 155. The guideline selection component 150 may be trained to perform semantic/lexical comparisons between potential guideline(s) and input dialog context data 145. The guideline selection component 150 may also be more generally trained, for example, to learn latent/hidden representations of dialog text/guideline text to select appropriate guidelines without specific structures being applied to its training.

The precision of the guideline selection component 150 in selecting one or more guideline(s) may be based on a number of factors including the availability of guidelines in the guideline storage 170, the specificity of the available dialog context data 145, the precise configuration of the guideline selection component 150, or the like. For example, if a dialog involves booking a flight the guideline selection component 150 may be configured to potentially select any flight booking related guidelines. Or, if such guidelines are available, at the appropriate point in the dialog the guideline selection component 150 may only select guidelines related to selecting a flight time while at another point in the dialog the guideline selection component 150 may only select guidelines related to selecting a seat on the flight. In another example, the guideline selection component 150 may select generalized appointment guidelines when engaging in a dialog involving a doctor's appointment but may switch to a more specific guideline when a user is describing a symptom. As can be appreciated, the specificity and selection of guidelines, is configurable. This configuration and use of guidelines allows more generalized chatbots/dialog components (e.g., dialog management component 185, response generation component 161, response selection component 163, NLG 180, etc.) to operate in a more customized fashion through use of configurable guidelines and the guideline selection component 150 than may otherwise be possible without a full retraining of a dialog manager.

As shown in FIG. 1A, the selected guideline(s) 155 is passed to the response generation component 161 along with the dialog context data 145 so the response generation component 161 may generate response data 165 responsive to the natural language input data 115 (which may be represented in the dialog context data 145). The data passed as selected guideline(s) 155 may include data representing the natural language text of the selected guideline. The response generation component 161 comprises a ML trained component to determine natural language text that adheres to the guideline(s) 155 and is coherent within the context of the dialog thusfar, as represented by the dialog context data 145. The response generation component 161 may be trained to perform linguistic reasoning to determine responsive natural language text from the dialog context data 145 and guideline(s) 155. The response generation component 161 may be configured to behave in a non-deterministic manner, thus configuring it to determine multiple syntactic variations and/or paraphrases that are appropriate given certain input dialog context data 145 and guideline(s) 155. The response generation component 161 may be configured to output an N-best list of potential responses, each with a score corresponding to how relevant the particular response for the natural language input data 115. The top scoring response may be output as response data 165 and sent to the dialog orchestrator component 140 and/or other component. If an N-best list is output, it may be sent to a selection component (e.g., response selection component 163 shown in FIG. 1B).

As shown in FIG. 1B, the selected guideline(s) 155 and dialog context data 145 may also be passed to a response selection component 163, along with potential responses 195, so the response selection component 163 may select from among the potential responses 195 for purposes of determining the response data 165. The potential responses 195 may include potential dialog responses determined by a number of different components such as an NLG 180 (which may include the response generation component 161 discussed above), a skill (such as 490/590 discussed below) and/or some other component. The response selection component 163 may use one or more ML component(s) to process the guideline(s) 155 and dialog context data 145 to select one or more of the potential responses 195 as most appropriate, and output the selected response(s) as response data 165. The response selection component 163 may be configured to score potential responses 195, where each potential response receive a respective score indicating how appropriate that potential response is to the natural language input data 115 in view of the particular dialog context data 145 and the selected guideline(s) 155. The top scoring potential response(s) may be included in the response data 165. The response data 165 may include data representing the natural language text of the selected response(s) for further processing by the system 100 (e.g., dialog management component 185 or some other component).

Figure 2A:
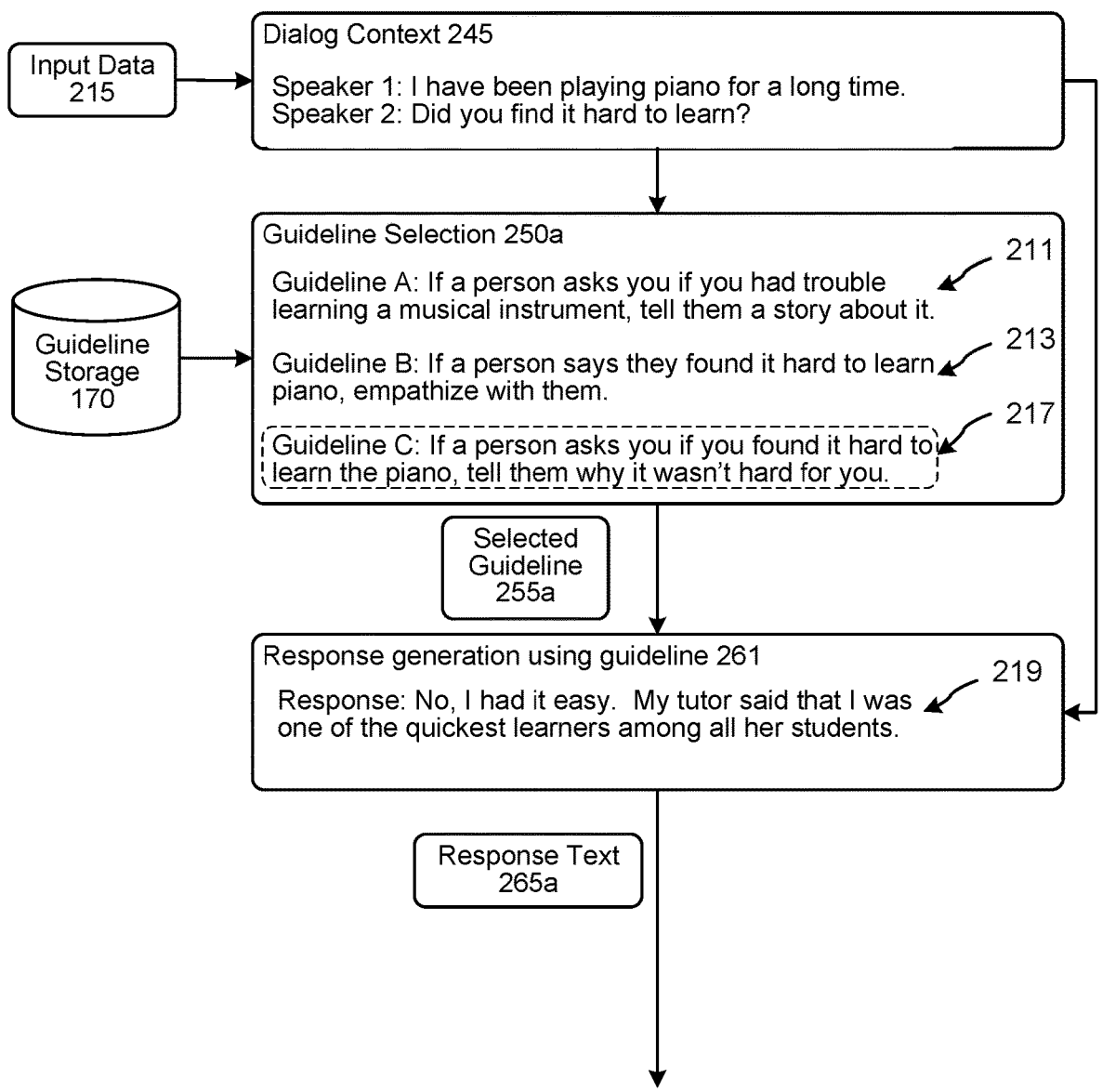
FIG. 2A illustrates an example of using dialog category data to generate a potential dialog response, in accordance with some embodiments of the present disclosure.

FIG. 2A illustrates an example of operations that may use the components of FIG. 1A. In one example, input data 215 is received from a user device 110 as part of a dialog. The system 100 determines dialog context data 245 which may include dialog history data including all or a portion of the previous dialog turns, including any previous user inputs and/or system responses. As illustrated in FIG. 2A, the dialog context data 245 includes dialog history data representing two natural language statements, one by speaker 1 and one by speaker 2. The system 100 may then perform guideline selection 250a using the dialog context data 245, which may be performed by guideline selection component 150.

The guideline selection component 150 processes the dialog context data 245 and the available natural language guidelines in guideline storage 170 to determine one or more guidelines that are applicable to dialog context data 245. As illustrated, the guideline selection component 150 may process three guidelines, 211, 213, and 217 (though more may also be processed). Guideline A 211 indicates "If a person asks you if you had trouble learning a musical instrument, tell them a story about it." Guideline B 213 indicates "If a person says they found it hard to learn piano, empathize with them." Guideline C 217 indicates "If a person asks you if you found it hard to learn the piano, tell them why it wasn't hard for you." The guideline selection component 150 may perform guideline selection 250a by processing those guidelines with respect to dialog context data 245 to determine a score for each guideline. The scores may indicate, in the example of FIG. 2A, that guideline C 217 is the most applicable to dialog context data 245. The guideline selection component 150 may thus select guideline C 217 and output its text (or data representing its natural language text) as the selected guideline 255a. Although FIG. 2A illustrates output of only a single selected guideline, guideline selection component 150 may select more than one guideline depending on system operation.

The system 100 may then perform response generation 261 using the selected guideline 255a. The response generation 261 may involve the response generation component 161. The response generation component 161 may process the selected guideline 255a and the dialog context data 245 using the ML component(s) to determine natural language text responsive to input data 215, appropriate within the dialog as represented by dialog context data 245 and adhering to selected guideline 255a. As shown in FIG. 2A, the response generation component 161 generates response text 219 of "No, I had it easy. My tutor said that I was one of the quickest learners among all her students." The response generation component 161 may thus output data representing the text of the generated system dialog response 219 as response text 265a.

Figure 2B:
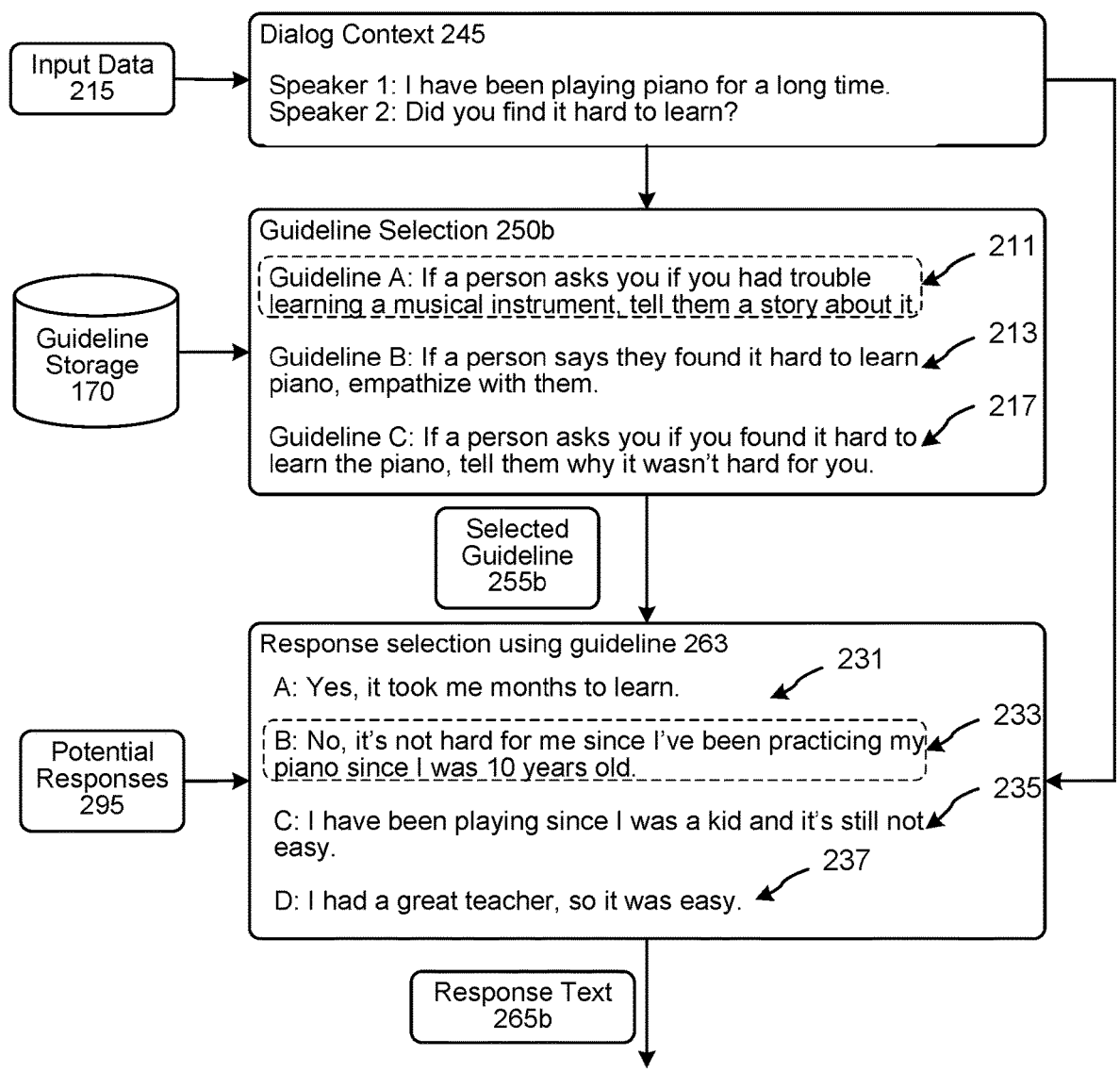
FIG. 2B illustrates an example of using dialog category data to select a potential dialog response, in accordance with some embodiments of the present disclosure.

FIG. 2B illustrates an example of operations that may use the components of FIG. 1B. As above with regard to FIG. 2A, input data 215 is received from a user device 110 as part of a dialog. The system 100 determines dialog context data 245 which may include dialog history data including all or a portion of the previous dialog turns, including any previous user inputs and/or system responses. The dialog context 245 in the example of FIG. 2B is the same as was illustrated in FIG. 2A. The system 100 may then perform guideline selection 250b using the dialog context data 245, which may be performed by guideline selection component 150.

As above with FIG. 2A, the guideline selection component 150 processes the dialog context data 245 and the available natural language guidelines in guideline storage 170 to determine one or more guidelines that are applicable to dialog context data 245. The guidelines considered in FIG. 2B are the same as those illustrated above in FIG. 2A, however in the example of FIG. 2B, the guideline selection component 150 may select guideline A 211 as the top scoring guideline in view of dialog context data 245 and thus may its text (or data representing its natural language text) as the selected guideline 255b.

The system 100 may then perform response selection 263 using the selected guideline 255b. The response selection 263 may involve the response selection component 163. The response selection component 163 may receive potential responses 295 from one or more sources (e.g., the NLU 180). As illustrated in FIG. 2B, the potential responses 295 include four options. Potential response A 231 includes the text: "Yes, it took me months to learn." Potential response B 233 includes the text: "No, it's not hard for me since I've been practicing my piano since I was 10 years old." Potential response C 235 includes the text: "I have been playing since I was a kid and it's still not easy." Potential response D 237 includes the text: "I had a great teacher, so it was easy." The response selection component 163 may process the text of the potential responses 295 along with the selected guideline 255b and the dialog context data 245 to determine scores corresponding to each of the potential responses 295. As shown in FIG. 2B. as part of response selection 263 the response selection component 163 may determine that potential response B 233 was the highest scoring response and therefore the most responsive to input data 215 in view of dialog context data 245 and selected guideline 255b. The response selection component 163 may thus output data representing the text of the selected system dialog response 233 as response text 265b. Although FIG. 2B illustrates output of only a single selected system response, response selection component 163 may select more than one response for output depending on system operation.

The resulting text of the determined dialog response in FIG. 1A and/or FIG. 1B may be output as response text 265a/265b and returned to the dialog orchestrator component 140 and/or some other component. The dialog orchestrator component 140 and/or dialog management component 185 may then output the response text 265a/265b to another component (for example TTS 480/580 (as discussed below) for processing into output audio data) so that a dialog response may be sent to device 110 and output for presentation to user 5.

To train the various components discussed above (guideline selection component 150, response generation component 161, and response selection component 163) that operate on the natural language guidelines, a variety of training operations may be performed to annotate and process dialog data to train the underlying ML models of guideline selection component 150, response generation component 161, and/or response selection component 163 to operate as desired in system 100.

Such training may involve annotating available training dialog data (e.g., dialog data that is available from existing dialogs and may be used to train components discussed herein). Such training dialog data may be provided to human annotators along with information about potential next responses, potential guidelines, and/or other data which may be collected, processed, extrapolated, etc. to train the components discussed herein. For example, such training may involve collecting annotations of whether a guideline is relevant or irrelevant to a conversation context shown to the annotator. Such annotation data may be used to train guideline selection component 150. Further, such training may involve collecting annotations of whether a set of potential system responses follow or violate a particular natural language guideline presented to the annotators. Such annotation data may be used to train the response generation component 161 and/or response selection component 163. In addition, to evaluate if models have a sufficiently deep semantic understanding between the guidelines, the dialog context, and the potential system responses, and to avoid overfitting and making predictions based on simple semantic and lexical overlap, the training may involve collecting adversarial examples (e.g., examples of potential responses that do not match a guideline and/or examples of a guideline that do not apply to a particular dialog context) and using such adversarial examples to train and test sets for the tasks to be performed by the components discussed above.

The system 100 may coordinate training the above components to perform their respective functions (e.g., for response generation component 161 to train it to perform generating a dialog response r (e.g., response data 165) that is coherent to a dialog context C (e.g., represented by dialog context data 145) in view of a provided guideline g (e.g., guideline(s) 155)). To train the ML component(s) (such as those to be included in the response generation component 161 to perform the response generation), the training may use existing annotated/augmented conversations from existing dialog datasets. The training may also involve collecting customized annotations to use in training. Specifically, the training may involve collecting annotations to form a triplet C, g, $r_{cg}$, where C is the context of the dialog, guideline g describes the contexts to which the particular guideline is applicable to and the content of the responses thereto (which may include text examples of acceptable responses), and response $r_{cg}$ is coherent within the context and follows the guideline. The system may obtain human annotations indicating whether a guideline is relevant or irrelevant to a particular context as well as human annotations indicating whether a response follows a guideline or not, which may include obtaining adversarial responses that purposefully violate a guideline.

The annotation process may collect annotation data for the triplet (C, g, $r_{cg}$) through certain approaches. In one approach, illustrated in FIG. 3A, an annotator may be shown an interface 310 showing a dialog history 312 and a proposed response 314. The annotator then inputs text of a proposed natural language guideline (for example in input field 316) such that the proposed response 314 is an appropriate system response to be returned in view of the provided dialog history 312 and the input guideline 316. The received data from the annotation may be stored and gathered into a training data set for training the above mentioned components. Annotators may be shown multiple good and bad examples for the task and may be encouraged to use abstract concepts in the guidelines so that they can generalize over novel contexts in order to create a robust training set.

Figure 3A:
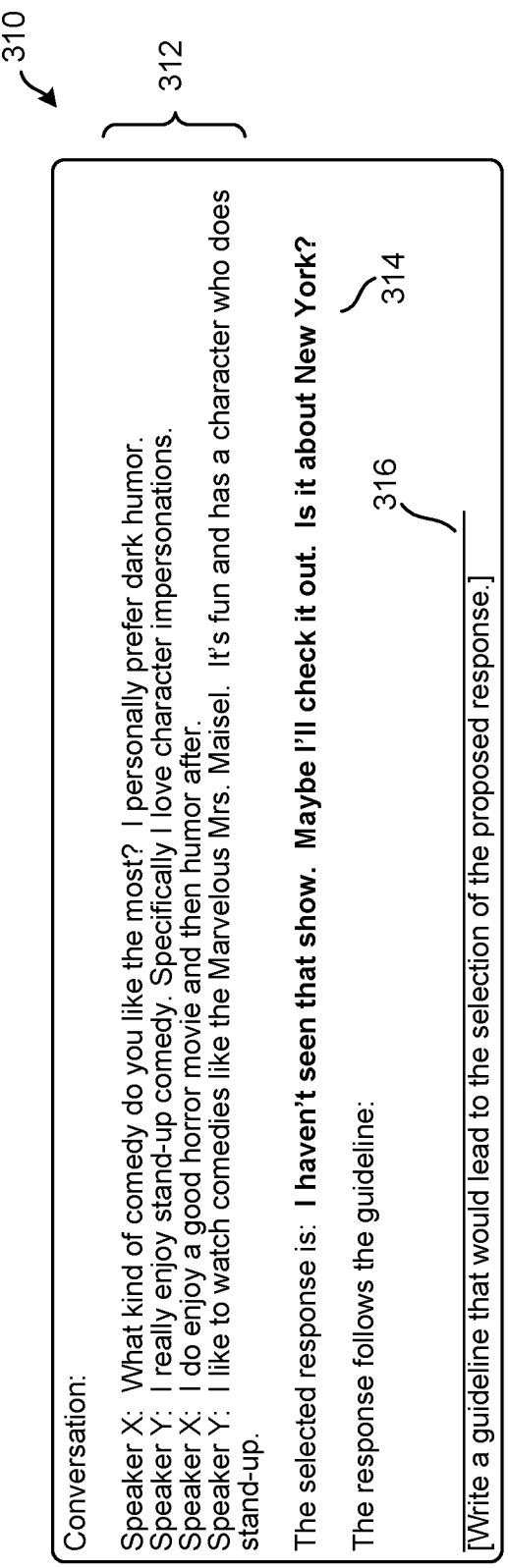
Figure 3B:
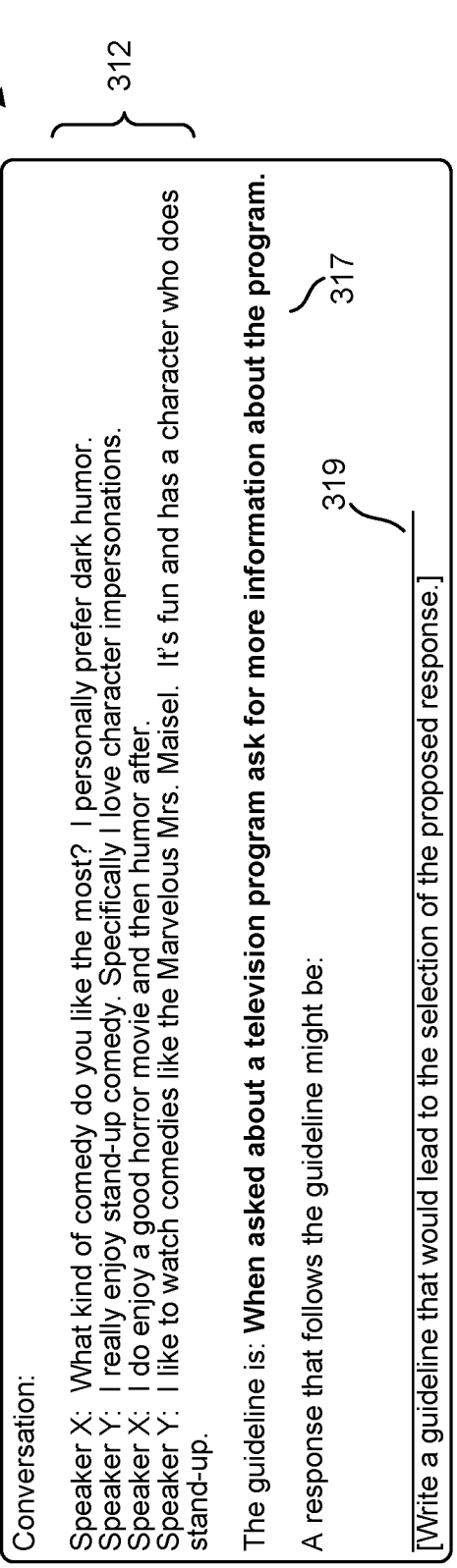

In another approach, illustrated in FIG. 3B, an annotator may be shown an interface 315 showing a dialog history 312 and a suggested guideline 317. The annotator then inputs text of an appropriate response (for example in input field 319) that follows the natural language guideline 317 in view of the provided dialog history 312. The received data from the annotation may also be stored and gathered into a training data set for training the above mentioned components. In particular the response may be added to a response data $R^b$.

In another approach, illustrated in FIG. 3C, an annotator may be shown an interface 320 which displays a set of guidelines $G_c \epsilon (g_1, g_2, \ldots g_k)$. The set of guidelines $G_c$ is shown as item 328 in FIG. 3C. The annotator is also shown a particular dialog history 322 and is asked 326 if a particular guideline is relevant to the last statement 324 of the dialog history 322. The individual presented guidelines 328 may be chosen from annotations collected during the guideline writing tasks discussed above in reference to FIG. 3A and/or may be generated by a version of a guideline generation model $M_g$ which is tuned for the guideline generation task. The model $M_g$ may be trained to generate guidelines given a pair of contexts and responses using annotations from the guideline writing task. $M_g$ may be used to create a large set of synthetic guidelines $G_{BST}$ conditioned on the contexts and responses from a training dataset. We create Gc from G (guidelines) for a context C (e.g., dialog history) by retrieving the top 5 highest scored guidelines from one or more training data set(s) using context-guideline similarity. The received data from the annotation may also be stored and gathered into a training data set for training the above mentioned components.

In another approach, illustrated in FIG. 3D, an annotator may be shown an interface 330 that can be used to indicate which responses match a potential guideline. The annotator is shown a dialog history context C 332 and presented with a number of responses Rh 334. For each response, the annotator may indicate (using check boxes 338) whether the particular responses matches the given guideline 336. Thus each annotation instance for FIG. 3D may indicate the particular context C 332, the guideline 336, and the responses (among 334) indicated as following the guideline 336 in view of the dialog history context 332 (as selected in 338) as well as responses (again, from among 334) that were not indicated as following the guideline 336 in view of the dialog history context 332 (as not selected in 338), thus providing both positive and negative examples. The received data from the annotation may also be stored and gathered into a training data set for training the above mentioned components.

In another approach, illustrated in FIG. 3E, the system may determine further negative training examples. As illustrated, an annotator may be shown an interface 340 that can be used to indicate how to edit a response so that it does not match a provided guideline. An annotator may be shown dialog history context C 342 and a guideline 344. The annotator may also be given a selected response r 346 and asked to provide a version of the response r' (in the field 348) that does not satisfy the guideline 344 in view of the context C 342. The received data from the annotation may also be stored and gathered into a training data set for training the above mentioned components. In this way the system may obtain training data that allows the model to learn to be more robust to what constitutes an improper response (rather than overfitting on positive examples). Using such data the system 100 may train models that have more defined boundaries of which responses do or do not satisfy certain guidelines.

As can be appreciated, may different examples and combinations of the training data (such as that illustrated in FIGS. 3A-3E) are possible with the system being configured to mix and match responses, context data, guidelines, etc. to obtain a robust training set for purposes of training the dialog management component 185 components that rely on the guidelines (e.g., guideline selection component 150, response generation component 161, and response selection component 163). Further, the data used to provide the interfaces above (310, 315, 320, 330, and 340) may be obtained from different datasets that may be available from other sources, generated for the specific purposes outlined here, etc.

FIG. 4 shows example components that may be included in the system 100 shown in FIGS. 1A and 1B in accordance with some embodiments. The various components illustrated in FIG. 4 may be located on the same physical device or on different physical devices. Communication between various components may occur directly or across one or more network(s) 199.

As shown in FIG. 4, a microphone or array of microphones (of otherwise associated with the device 110) may capture audio 401. The device 110 may process audio data, representing the audio 401, to determine whether speech is detected. The device 110 may use various techniques to determine whether audio data includes speech. In some implementations, for example, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other implementations, the device 110 may additionally or alternatively implement a classifier configured to distinguish speech from background noise. The classifier may be implemented by techniques such as linear classifiers, support vector machines, and decision trees. In still other implementations, the device 110 may additionally or alternatively apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system component(s) 120. In at least some embodiments, such determination may be made using a wakeword detection component 420 of the device 110. The wakeword detection component 420 may be configured to detect various wakewords. In at least some examples, each wakeword may correspond to a name of a different digital assistant. An example wakeword/digital assistant name is "Alexa."

Wakeword detection may be performed without performing linguistic analysis, textual analysis, or semantic analysis. Instead, the audio data may be analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 420 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 420 detects a wakeword, the device 110 may "wake" and begin transmitting audio data 411, representing the audio 401, to the system component(s) 120. The audio data 411 may include the detected wakeword, or the device 110 may remove the portion of the audio data 411 corresponding to the detected wakeword prior to sending the audio data 411 to the system component(s) 120.

The system component(s) 120 may include an orchestrator component 430 configured to, among other things, coordinate data transmissions between components of the system component(s) 120. The orchestrator component 430 may receive the audio data 411 from the device 110, and may send the audio data 411 to an ASR component 450.

The ASR component 450 may transcribe the audio data 411 into ASR output data including one or more ASR hypotheses. An ASR hypothesis may be configured as a textual interpretation of the speech in the audio data 411, or may be configured in another manner, such as one or more tokens. Each ASR hypothesis may represent a different likely interpretation of the speech represented in the audio data 411. Each ASR hypothesis may be associated with a score (e.g., confidence score, probability score, or the like) representing the associated ASR hypothesis correctly represents the speech in the audio 401.

The ASR component 450 may interpret the speech in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the speech represented in the audio data 411.

In at least some instances, instead of the device 110 receiving a spoken natural language input, the device 110 may receive a textual (e.g., typed using a keyboard) natural language input. The device 110 may determine text data representing the textual natural language input, and may send the text data to the system component(s) 120, wherein the text data may be received by the orchestrator component 330. The orchestrator component 330 may send the text data or ASR output data, depending on the type of natural language input received, to a NLU component 460.

The NLU component 460 may process the ASR output data or text data to determine one or more NLU hypotheses embodied in NLU output data. The NLU component 460 may perform intent classification (IC) processing on the ASR output data or text data to determine an intent of the natural language input. An intent may correspond to an action to be performed that is responsive to the natural language input. To perform IC processing, the NLU component 460 may communicate with a database of words linked to intents. For example, a music intent database may link words and phrases such as "quiet," "volume off," and "mute" to a <Mute> intent. The NLU component 460 may identify intents by comparing words and phrases in ASR output data or text data to the words and phrases in an intents database. In some embodiments, the NLU component 460 may communicate with multiple intents databases, with each intents database corresponding to one or more intents associated with a particular skill. A "skill" may refer to software, that may be placed on a machine or a virtual machine (e.g., software that may be launched in a virtual instance when called), configured to process NLU output data and perform one or more actions in response thereto.

As one example, IC processing of the natural language input "play my workout playlist" may determine an intent of <PlayMusic>. As another example, IC processing of the natural language input "call mom" may determine an intent of <Call>. As yet another example, IC processing of the natural language input "call mom using video" may determine an intent of <VideoCall>. In still another example, IC processing of the natural language input "what is today's weather" may determine an intent of <OutputWeather>.

The NLU component 460 may also perform named entity recognition (NER) processing on the ASR output data or text data to determine one or more portions, sometimes referred to as slots, of the natural language input that may be needed for post-NLU processing (e.g., processing performed by a skill). As one example, named entity recognition (NER) processing of the natural language input "play [song name]" may determine an entity type of "SongName" and an entity value corresponding to the indicated song name. As another example, NER processing of the natural language input "call mom" may determine an entity type of "Recipient" and an entity value corresponding to "mom." As still another example, NER processing of the natural language input "what is today's weather" may determine an entity type of "Date" and an entity value of "today."

In some embodiments, the intents identifiable by the NLU component 460 may be linked to one or more grammar frameworks with entity types that can be populated with entity values. Each entity type of a grammar framework may correspond to a portion of ASR output data or text data that the NLU component 460 identified as corresponding to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 460 may perform NER processing to identify words in ASR output data or text data as subject, object, verb, preposition, etc., based on grammar rules and/or models. Then, the NLU component 460 may perform IC processing using the identified verb to identify an intent. Thereafter, the NLU component 460 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 460 may generate NLU output data including one or more NLU hypotheses, with each NLU hypothesis including an intent and optionally one or more entity types and corresponding entity values. In some embodiments, the NLU component 460 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, in some implementations, the system component(s) 120 may perform speech processing using two different components (e.g., the ASR component 450 and the NLU component 460). In other implementations, the system component(s) 120 may additionally or alternatively implement a spoken language understanding (SLU) component 440 configured to process audio data 411 to determine NLU output data.

The SLU component 440 may be equivalent to a combination of the ASR component 450 and the NLU component 460. Yet, the SLU component 440 may process audio data 411 and directly determine the NLU output data, without an intermediate step of generating ASR output data. As such, the SLU component 440 may take audio data 411 representing a spoken natural language input and attempt to make a semantic interpretation of the spoken natural language input. That is, the SLU component 440 may determine a meaning associated with the spoken natural language input and then implement that meaning. For example, the SLU component 440 may interpret audio data 411 representing a spoken natural language input in order to derive a desired action. The SLU component 440 may output a most likely NLU hypothesis, or multiple NLU hypotheses associated with respective confidence or other scores (such as probability scores, etc.).

As shown in FIG. 4, the system component(s) 120 may include or otherwise communicate with one or more skills 490. As noted above, a "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill 490 may be called to output music sung by the indicated artist. For further example, for NLU output data including a <TurnOn> intent, a "device" entity type, and an entity value of "lights," a smart home skill 490 may be called to cause one or more "smart" lights to operate in an "on" state. In another example, for NLU output data including an <OutputWeather> intent, a "location" entity type, and an entity value corresponding to a geographic location of the device 110, a weather skill 490 may be called to output weather information for the geographic location. For further example, for NLU output data including a <BookRide> intent, a taxi skill 490 may be called to book a requested ride. In another example, for NLU output data including a <BuyPizza> intent, a restaurant skill 490 may be called to place an order for a pizza.

A skill 490 may operate within the system 100, e.g., as a component of the system component(s) 120, the device 110, a restaurant electronic ordering system, a taxi electronic booking system, etc., in order to complete certain functions. Inputs to a skill 490 may come from speech processing interactions or through other interactions or input sources. A skill may be associated with a corresponding skill component(s) 425 which may include computing resources that supplement the processing of the skill 490 and may be remotely located from the skill, for example as part of a supporting cloud computing environment. Depending on system configuration, a skill component(s) 425 may perform significant processing related to the skill 490.

A skill 490 may be associated with a domain. A non-limiting list of example domains includes a smart home domain, a music domain, a video domain, a weather domain, a communications domain, a flash briefing domain, a shopping domain, and a custom domain.

The system component(s) 120 may include a TTS component 480 that generates audio data including synthesized speech. The data input to the TTS component 480 may come from a skill 490, the orchestrator component 430, or another component of the system component(s) 120.

In one method of synthesis called "unit selection," the TTS component 480 may match input data against a database of recorded speech. The TTS component 480 may select matching units of recorded speech and concatenate the units together to form audio data. In another method of synthesis called "parametric synthesis," the TTS component 480 may vary parameters such as frequency, volume, and noise to determine audio data including an artificial speech waveform. Parametric synthesis may use a computerized voice generator, sometimes called a vocoder. In another technique, TTS may rely on neural networks or other machine learning components to process text data into audio data or the like to be processed by a vocoder and/or output as audio of synthesized speech.

The system component(s) 120 may include a user recognition component 495. The user recognition component 495 may recognize one or more users using various data. The user recognition component 495 may take as input the audio data 411. The user recognition component 495 may perform user recognition by comparing speech characteristics in the audio data 411 to stored speech characteristics of users. The user recognition component 495 may additionally or alternatively perform user recognition by comparing biometric data (e.g., fingerprint data, iris data, retina data, etc.), received by the system component(s) 120 in correlation with a natural language input, to stored biometric data of users. The user recognition component 495 may additionally or alternatively perform user recognition by comparing image data (e.g., including a representation of one or more features of a user), received by the system component(s) 120 in correlation with a natural language input, with stored image data including representations of features of different users. The user recognition component 495 may also perform other or additional user recognition processes. For a particular natural language input, the user recognition component 495 may perform processing with respect to stored data of users associated with the device 110 that received the natural language input.

The user recognition component 495 may determine whether a natural language input originated from a particular user. For example, the user recognition component 495 may determine a first value representing a likelihood that a natural language input originated from a first user, a second value representing a likelihood that the natural language input originated from a second user, etc. The user recognition component 495 may also determine an overall confidence regarding the accuracy of user recognition processing.

The user recognition component 495 may output a single user identifier corresponding to the most likely user that originated the natural language input. Alternatively, the user recognition component 495 may output multiple user identifiers (e.g., in the form of an N-best list) with respective values representing likelihoods of respective users originating the natural language input. The output of the user recognition component 495 may be used to inform NLU processing, processing performed by a skill 490, and/or processing performed by other components of the system component(s) 120 and/or other systems.

The system component(s) 120 may include profile storage 470. The profile storage 470 may include a variety of data related to individual users, groups of users, devices, etc., that interact with the system component(s) 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 470 may include one or more user profiles. Each user profile may be associated with a different user identifier. Each user profile may include various user identifying data (e.g., name, gender, address, one or more languages, etc.). Each user profile may also include preferences of the user. Each user profile may include one or more device identifiers, each representing a respective device registered to the user. Each user profile may include skill identifiers that identify the skills 490 that the user has enabled. When a user enables a skill 490, the user is providing the system component(s) 120 with permission to allow the skill 490 to execute with respect to the user's natural language inputs. If a user does not enable a skill 490, the system component(s) 120 may not execute the skill 490 with respect to the user's natural language inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 470 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household. Information from profile storage 470 (including user preference information, user ID information, or the like) may be included as context data 145 to be considered by components of the dialog management component 185.

The system component(s) 120 may also include a dialog management component 185, which may manage various aspects of an ongoing dialog between the user 5 and the system 100. Example components that may be included within the dialog management component 185, as well as example operations that may be performed by such components, are described in detail above in connection with FIGS. 1A-2B and below in connection with FIGS. 6-8.

The system component(s) 120 may include a sentiment detection component 435 configured to analyze image data representing a face of the user 5, and/or speech of the user (in particular tone, words, used, etc.), to determine a sentiment (e.g., happy, sad, mad, etc.) of the user 5. Various processing described herein may be based on the sentiment, which may be included as context data 145 to be considered by components of the dialog management component 185.

Figure 5:
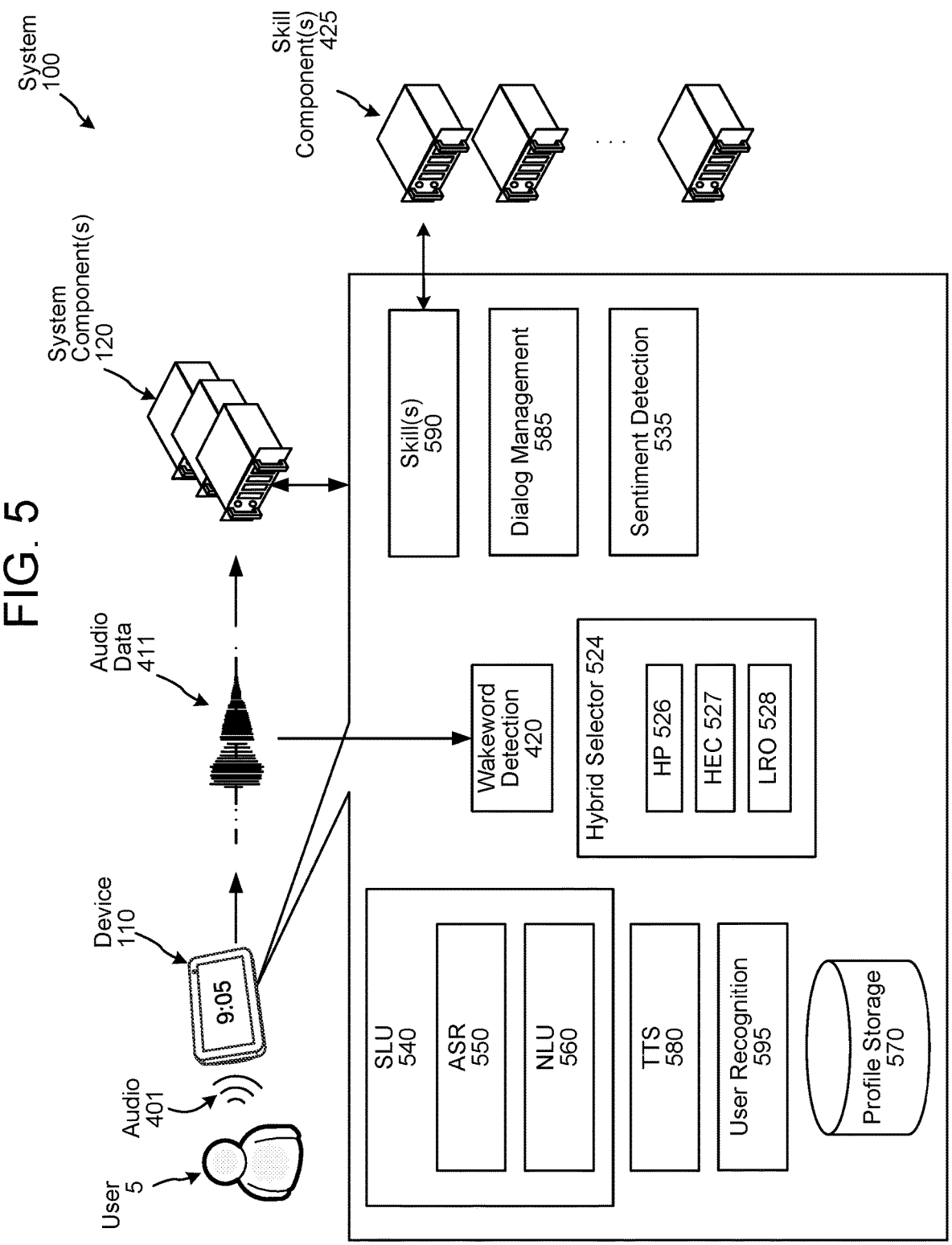
FIG. 5 is a conceptual diagram illustrating components that may be included in the device shown in FIGS. 1A and 1B, according to some embodiments of the present disclosure.

The foregoing describes illustrative components and processing of the system component(s) 120. With reference to FIG. 5, the following describes illustrative components and processing of the device 110. As noted previously in connection with FIG. 4, in some embodiments, the system component(s) 120 may receive the audio data 411 from the device 110, to recognize speech corresponding to a spoken natural language in the received audio data 411, and to perform functions in response to the recognized speech. In some embodiments, these functions may involve sending directives (e.g., commands) from the system component(s) 120 to the device 110 to cause the device 110 to perform an action, such as to output synthesized speech (responsive to the spoken natural language input) via a loudspeaker(s), and/or to control one or more secondary devices by sending control commands to the one or more secondary devices. In other embodiments the device may perform various speech processing operations on its own and/or in conjunction with the system component(s) 120.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted above, in some implementations, the device 110 may include a wakeword detection component 420 configured to detect a wakeword (e.g., "Alexa") that indicates to the device 110 that the audio data 411 is to be processed for determining NLU output data. In some embodiments, a hybrid selector 524 of the device 110 (shown in FIG. 5) may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or an on-device ASR component 550. The wakeword detection component 420 may also send an indication, to the hybrid selector 524, that a wakeword was not detected. In response to receiving such an indication, the hybrid selector 524 may refrain from sending the audio data 411 to the system component(s) 120, and may prevent the on-device ASR component 550 from processing the audio data 411. In this situation, the audio data 411 can be discarded.

The device 110 may conduct its own speech processing using on-device language processing components (such as an on-device SLU component 540, an on-device ASR component 550, and/or an on-device NLU component 560) similar to the manner discussed above with respect to the speech processing system-implemented SLU component 440, ASR component 450, and NLU component 460. The device 110 may also internally include, or otherwise have access to, other components such as one or more skills 590 (configured to operate in a similar manner as the system-implemented skills 490), a user recognition component 595 (configured to operate in a similar manner as the system-implemented user recognition component 495), profile storage 570 (configured to store similar profile data as the system-implemented profile storage 470), a dialog management component 585 (configured to operate in a similar manner as the system-implemented dialog management component 185), a sentiment detection component 535 (configured to operate in a similar manner as the system-implemented sentiment detection component 435), a TTS 580 (configured to operate in a similar manner as the system-implemented TTS 480), and other components. As described in more detail below, in some implementations, the dialog management component 585 of the device 110 may include one or more components of the dialog management component 185 described above. In at least some embodiments, the on-device profile storage 570 may store profile data only for a user or group of users specifically associated with the device 110.

In some embodiments, the on-device language processing components may not have the same capabilities as the language processing components implemented by the system component(s) 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances, the on-device language processing components may be able to interpret and respond to a local-type natural language input more quickly than processing that involves the system component(s) 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing that can be done by the system component(s) 120.

The hybrid selector 524 of the device 110 may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In some embodiments, the hybrid selector 524 may further include a local request orchestrator (LRO) 528 configured to notify the on-device ASR component 550 about the availability of the audio data 411, and to otherwise initiate the operations of on-device language processing when the audio data 411 becomes available. In general, the hybrid selector 524 may control execution of on-device language processing, such as by sending "execute" and "terminate" events/instructions. An "execute" event may instruct a component to continue any suspended execution (e.g., by instructing the component to execute on a previously determined intent in order to determine a directive). Meanwhile, a "terminate" event may instruct a component to terminate further execution, such as when the device 110 receives directive data from the system component(s) 120 and chooses to use that remotely determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the on-device ASR component 550 of the audio data 411. At this point, the hybrid selector 524 may wait for response data from either or both the system component(s) 120 and/or the on-device language processing components. However, the disclosure is not limited thereto, and in some examples the hybrid selector 524 may send the audio data 411 only to the on-device ASR component 550 without departing from the disclosure. For example, the device 110 may process the audio data 411 on-device without sending the audio data 411 to the system component(s) 120.

The on-device ASR component 550 may be configured to receive the audio data 411 from the hybrid selector 524, and to recognize speech in the audio data 411, and the on-device NLU component 560 may be configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In some embodiments, a device-determined directive may be serialized, much like how remotely-determined directives may be serialized for transmission in data packets over the network(s) 199. In some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 560) may be selected as usable to respond to a natural language input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language input, to use directive data received from the system component(s) 120, assuming a remote response is even received (e.g., when the device 110 is able to access the system component(s) 120 over the network(s) 199), or to determine output data requesting additional information from the user 5.

The device 110 and/or the system component(s) 120 may associate a unique identifier with each natural language input. The device 110 may include the unique identifier when sending the audio data 411 to the system component(s) 120, and the response data from the system component(s) 120 may include the unique identifier to identify to which natural language input the response data corresponds.

In some embodiments, the device 110 may include one or more skills 590 that may operate similar to the system-implemented skill(s) 490 described above. The skill(s) 590 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 6:
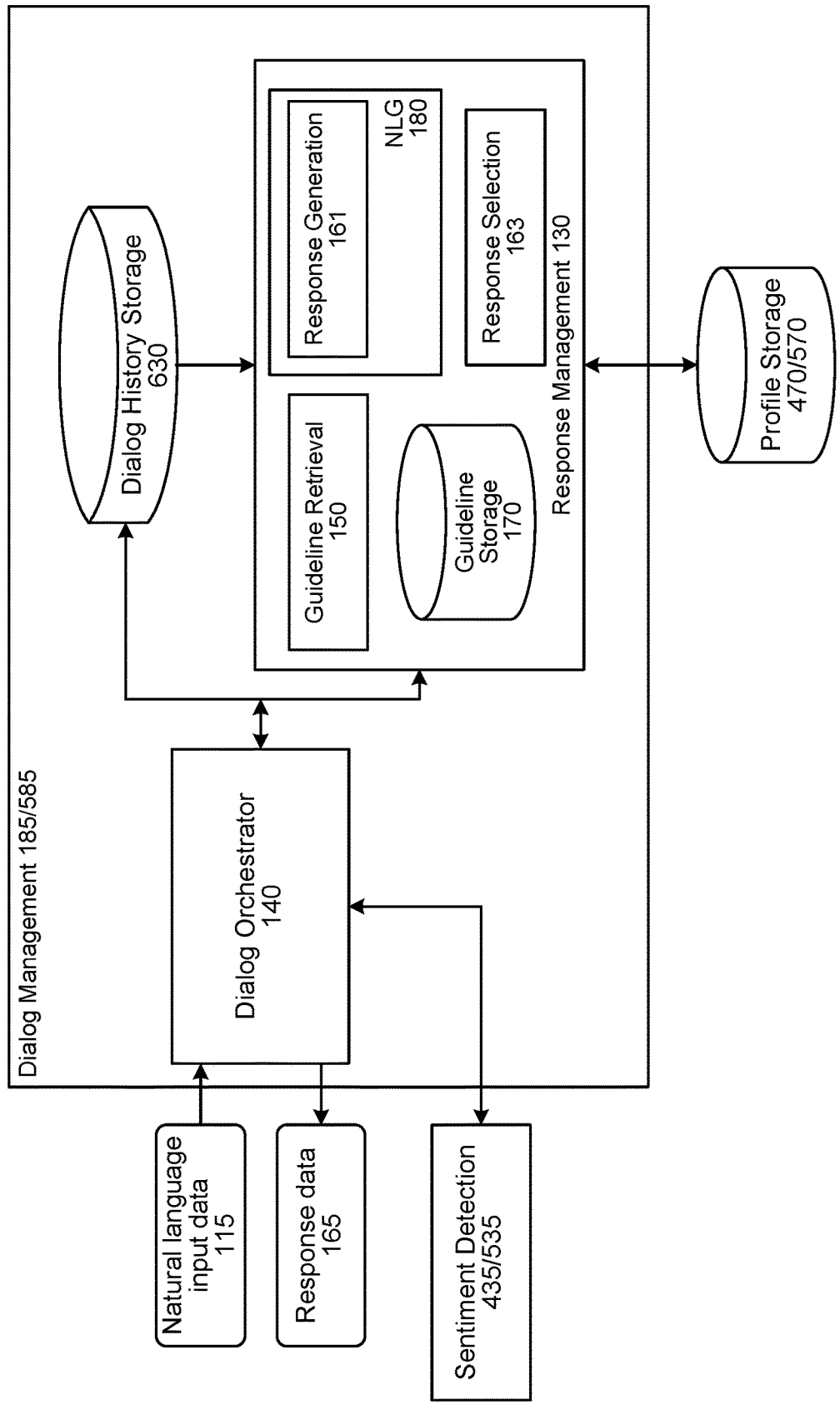
FIG. 6 shows an example implementation of a dialog management component, according to embodiments of the present disclosure.

FIG. 6 shows an example implementation of the dialog management component 185/585, which may be implemented by the system component(s) 120 (as shown in FIG. 4), by the device 110 (as shown in FIG. 5), or elsewhere in the system 100. In some embodiments, the dialog management component 185/585 may be implemented as a skill 490/590 (for example as a chatbot skill), or as a component of a skill 490/590. As shown in FIG. 6, in some implementations, in addition to the response management component 130 (described above), the dialog management component 185/585 may include a dialog orchestrator component 140 and a dialog history storage 630.

The dialog orchestrator component 140 may be configured to receive natural language input data 115, e.g., data corresponding to a natural language input provided by the user 5. The natural language input data 115 may include, for example, text data (e.g., from a user's textual input), ASR output data (e.g., data representing words spoken by a user) and/or NLU output data (e.g., data representing an intent, entity, command, etc.) corresponding to received audio data 411 generated in response to an utterance by the user 5. The dialog orchestrator component 140 may be configured to coordinate the transmission of data between components of the dialog management component 185/585. In some implementations, for example, the dialog orchestrator component 140 may selectively call one or more components of the dialog management component 185/585 based on a determined intent of the natural language input data 115. The response management component 130 may determine response data 165 that is to be sent to the device 110 or another component of the system 100. For example, in some implementations, the response data 165 may cause the device 110 to output audio corresponding to the response data 165 (e.g., by processing the response data 165 with a TTS component 480/580), or to output text corresponding to a system-generated response, e.g., via a display of the device 110. In some implementations, the response data 165 may additionally or alternatively cause the device 110 to perform an operation (e.g., to begin playing music), or may cause another device to take a certain action (e.g., to cause a "smart light" to turn on or off) or simply respond to a user as part of a non-goal oriented dialog exchange. The response management component 130 may determine and/or generate such response data 165 in any of a number of ways, such as those described herein with regard to conversation guidelines. As but a few examples, the response management component 130 may (A) provide a response as part of a chatbot exchange, (B) answer a question corresponding to the spoken natural language input data 115, e.g., by retrieving responsive data from a knowledge base, (C) retrieve data from an information source (e.g., a weather application) to respond to a command (e.g., "tell me about today's weather"), (D) retrieve requested content (e.g., a song or story) from a datastore, (E) determine a command to provide to a home automation system (e.g., a command to turn on the living room lights), (F) initiate a skill 490/590 (e.g., to begin playing Jeopardy), etc.

At runtime, the system component(s) 120/device 110 may receive natural language input data 115 corresponding to a dialog. As used herein and noted above, a "dialog" may refer to an exchange of related natural language input data 115 and system-generated response data 165. A dialog may be goal-oriented, meaning the dialog is directed to the performance of a specific action (e.g., figuring out what music the system 100 should play). Receipt of natural language input data 115 and performance of a corresponding action (i.e., output of a system-generated response) may be referred to as a dialog "turn." A dialog identifier may be associated with multiple related turns corresponding to consecutive related natural language inputs and system responses. Each turn may be associated with a respective turn identifier. One natural language input may be considered related to a subsequent natural language input, thereby causing a single dialog identifier to be associated with both natural language inputs. A first natural language input may be considered related to a second (subsequent) natural language input based on, for example, a length of time between receipt of the first and second natural language inputs, a length of time between performance of a system-generated response to the first natural language input and receipt of the second natural language input, the similarity of the subject matter of the first and second natural language inputs, and/or the similarity of the subject matter of the second natural language input and the system-generated response to the first natural language input.

As disclosed above, the NLU component 460/560 may be configured to determine an intent of a natural language input. At runtime, the NLU component 460/560 may determine that a first natural input language corresponds to an intent associated with the dialog management component 185/585, e.g., a skill 490/590. In response to such a determination, first natural language input data 115 may be sent to the dialog management component 185/585, resulting in the dialog management component 185/585 becoming "in focus" for a dialog including the first natural language input data 115. The orchestrator 140 of the dialog management component 185/585 may send the first natural language input data 115 to the response management component 130 for processing to determine response data 165 to send to the device 110 or elsewhere. Thereafter, when a second natural language input is received, the system component(s) 120/device 110 may determine that the second natural language input corresponds to the same dialog as the first natural language input, and thus determine that the dialog management component 185/585 remains in focus for the dialog. Based on the dialog management component 185/585 being in focus, second natural language input data 115 corresponding to the second natural language input may not undergo NLU processing by the NLU component 460/560. Rather, the second natural language input data 115, e.g., including ASR output data corresponding to the second natural language input, may be sent to the dialog management component 185/585.

The dialog history storage 630 of the dialog management component 185/585 may store various data relating to one or more dialogs. For example, for a given dialog, the dialog history storage 630 may associate a dialog identifier with the natural language input data 115 of the dialog, the intent(s) determined for the natural language input(s) of the dialog, the natural language input data 115 received by the dialog management component 185/585, and the response data 165 sent to the device 110 or elsewhere as part of the dialog. The dialog history storage 630 may receive data from the dialog orchestrator component 140 and/or the response management component 130. The context data 145 discussed above may be obtained from the dialog history storage 630.

Figure 7:
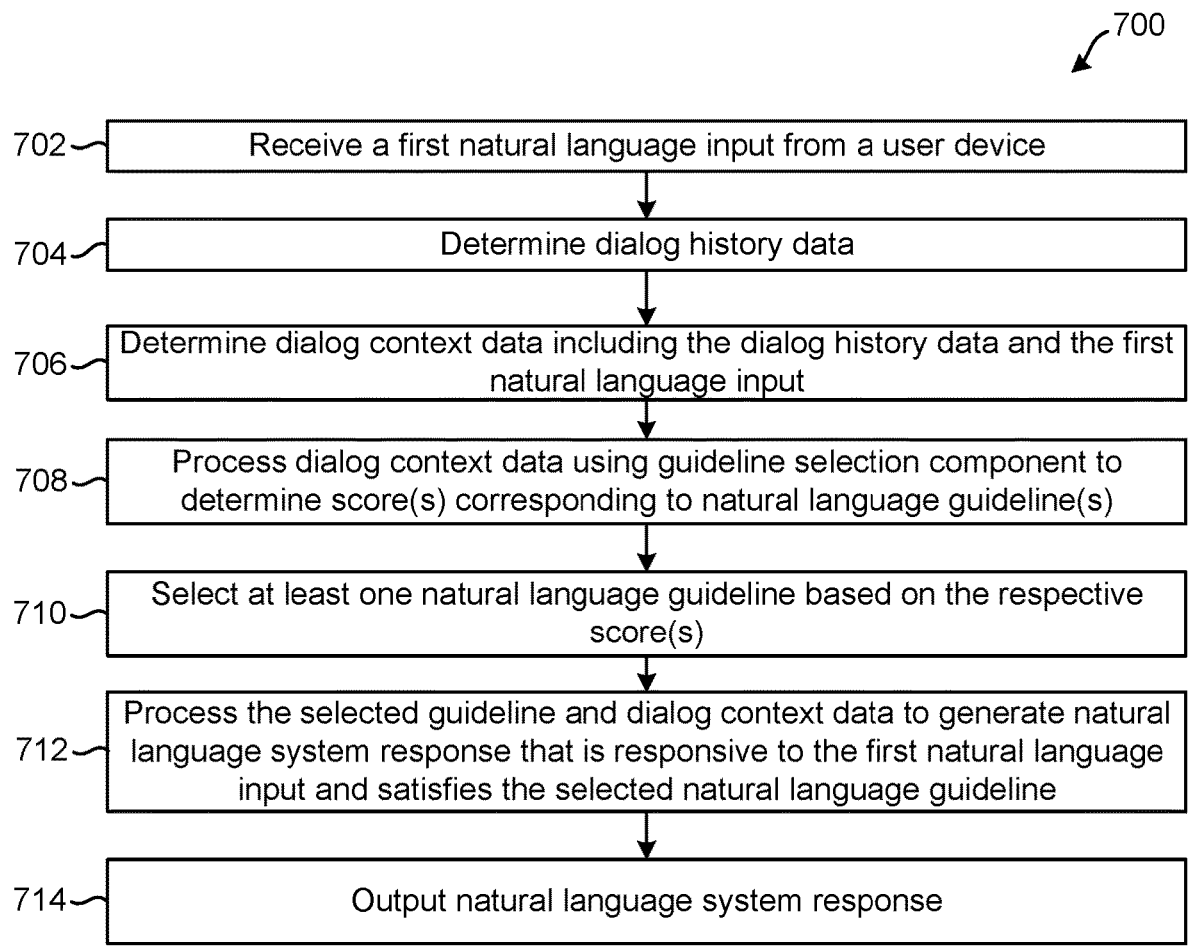
FIG. 7 shows an example process that may be performed by one or more components to use dialog category data to generate a potential dialog response, in accordance with some embodiments of the present disclosure.

FIG. 7 shows an example process 700 that may be performed by one or more components of the dialog management component 185/585 to generate an appropriate system dialog response using natural language dialog guidelines. As discussed above, a user may operate a device 110 (described above) to engage in a dialog with a natural language processing system 100. In some implementations, for example, the device 110 (described above) may be a voice-controlled device, such an Amazon Echo, and the user 5 may speak one or utterances in a vicinity of the device 110 during a dialog that is being managed by the dialog management component 185/585. In other implementation, the device 110 may determine text corresponding to a dialog in other ways, such as in response to the user 5 typing on a keyboard of the device 110.

As shown in FIG. 7, the dialog management component 185/585 may receive (702) a natural language input from a user device 110. For example, as shown in FIG. 6, natural language input data 115 representing an utterance (e.g., ASR data) by the user 5 may be received by the dialog orchestrator 140. The system may determine (704) dialog history data, for example by obtaining the dialog history data from dialog history storage 630. The dialog history data may represent (e.g., include the natural language text of) at least one previous natural language user input and at least one previous natural language system response. The system may then determine (706) dialog context data 145 including the dialog history data and the natural language input data 115. The system may then process (708) the dialog context data using the guideline selection component 150 to determine score(s) corresponding to at least one natural language guideline. This may include determining a first score corresponding to a first natural language dialog guideline and a second score corresponding to a second natural language dialog guideline, where the first and second natural language dialog guidelines (and potentially others) are retrieved from guideline storage 170. The guideline selection component 150 may also score/consider other natural language dialog guidelines. As noted above, each natural language dialog guideline may comprise a first portion including a natural language description of a condition in which the respective natural language dialog guideline should be applied and a second portion including a natural language description corresponding to a respective action to be taken in response to the respective condition. The system may then select (710) at least one natural language guideline (e.g., selected guideline(s) 155) based on the respective scores, thus determining that one guideline may be more applicable to the dialog context data than another condition.

The system may then process (712), for example by the response generation component 161, the selected guideline(s) 155 and the dialog context data 145 to generate a natural language system response that is responsive to the natural language input data 115 and satisfies the selected guideline(s) 155. The system may then output (714) the natural language system response, for example as response data 165.

Figure 8:
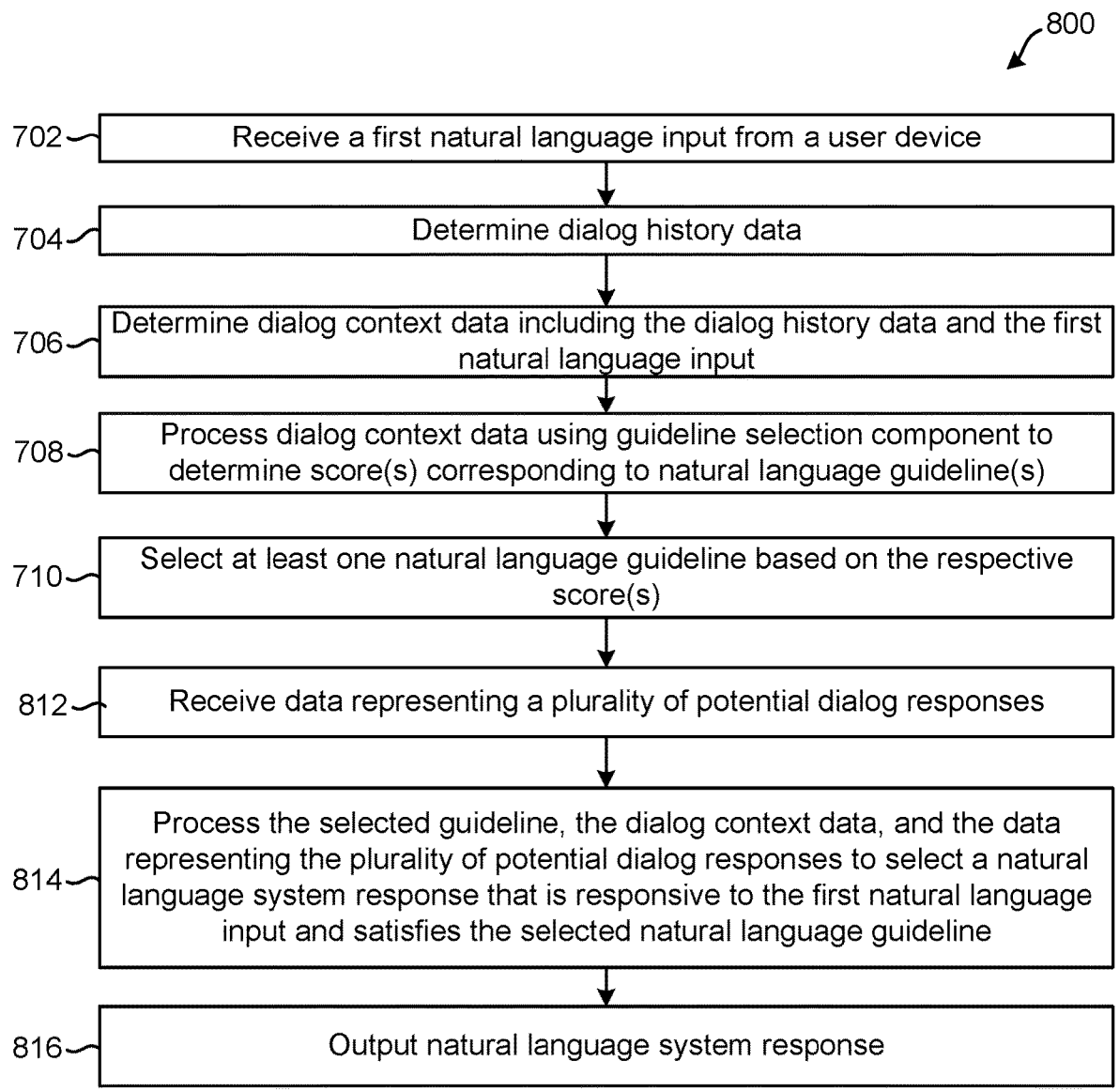
FIG. 8 shows an example process that may be performed by one or more components to use dialog category data to select a potential dialog response, in accordance with some embodiments of the present disclosure.

FIG. 8 shows an example process 800 that may be performed by one or more components of the dialog management component 185/585 to select an appropriate system dialog response using natural language dialog guidelines. Steps 702-710 of FIG. 8 are similar to the corresponding steps of FIG. 7. At step 812, the system, for example by response selection component 163, may receive (812) data representing a plurality of potential dialog responses 195. (The potential responses 195 may include a proposed response generated by the response generation component 161, for example as described to be output in step 714 in FIG. 7.) The system, for example by response selection component 163, may process (814) the selected guideline(s) 155, dialog context data 145 and the data representing the plurality of potential dialog responses 195 to select a natural language system response, from among the potential responses 195, that is responsive to the natural language input data 115 and satisfies the selected guideline(s) 155. The system may then output (816) the natural language system response, for example as response data 165.

Although not shown in FIG. 7 or 8, the response management component 130/dialog management component 185/585 may send the generated response data 165 to the device 110, thus causing the device 110 to output a corresponding response. In some implementations, the generated response data 165 may comprise audio data that causes the device 110 to output an audio response. In other implementations, the generated response data 165 may be text data and a TTS component 480/580 may be used to convert that text data into audio data that can be sent to the device 110. In still other implementations, the response management component 130 may additionally or alternatively send generated text data to the device 110 for display on a display screen of the device 110.

Various components discussed herein (for example, components of the response management component 130) may implement a machine learning (ML) model(s). Various machine learning techniques may be used to train and operate ML models. A ML model may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
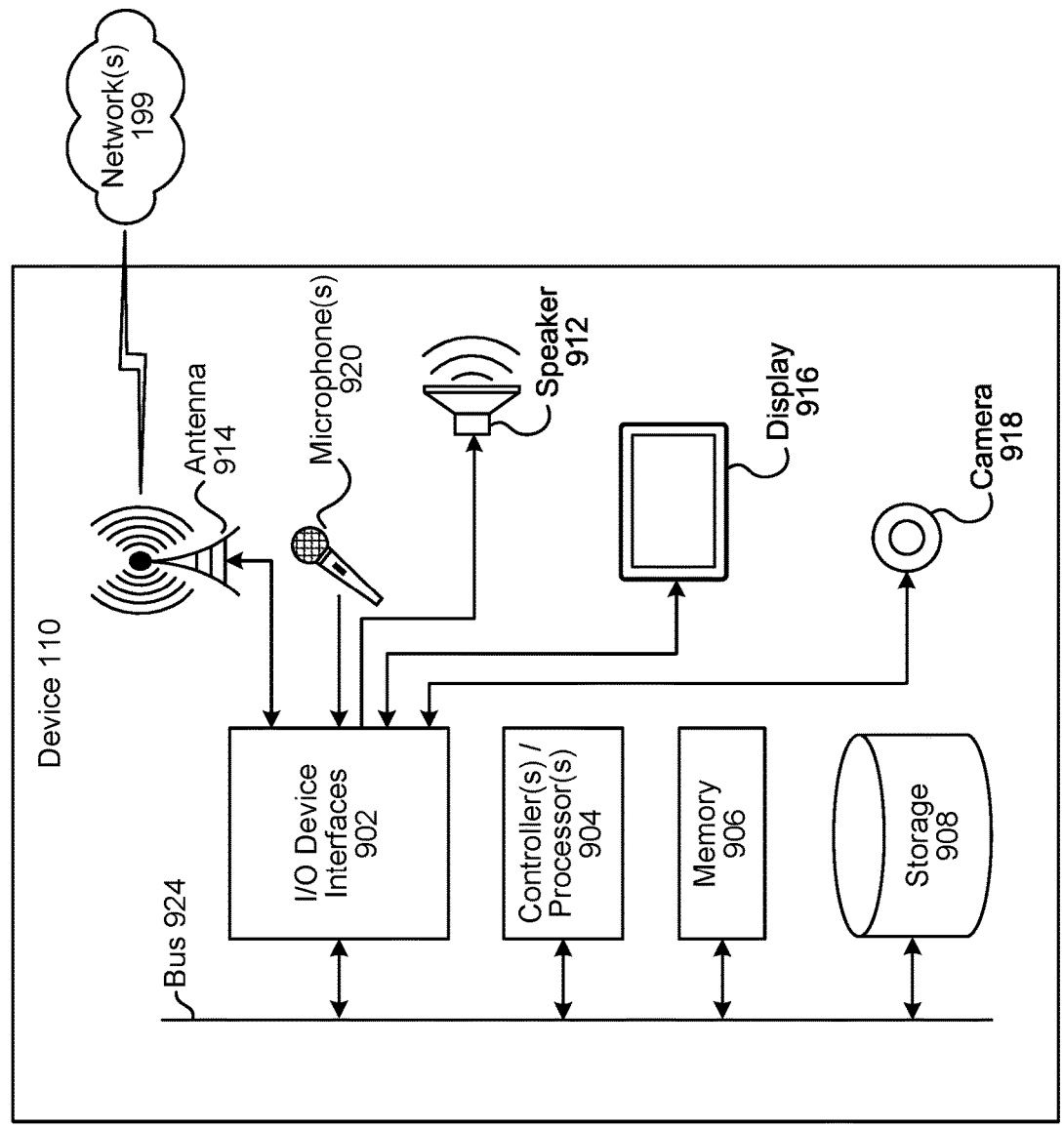
FIG. 9 is a block diagram conceptually illustrating example components of a device, according to some embodiments of the present disclosure.
Figure 10:
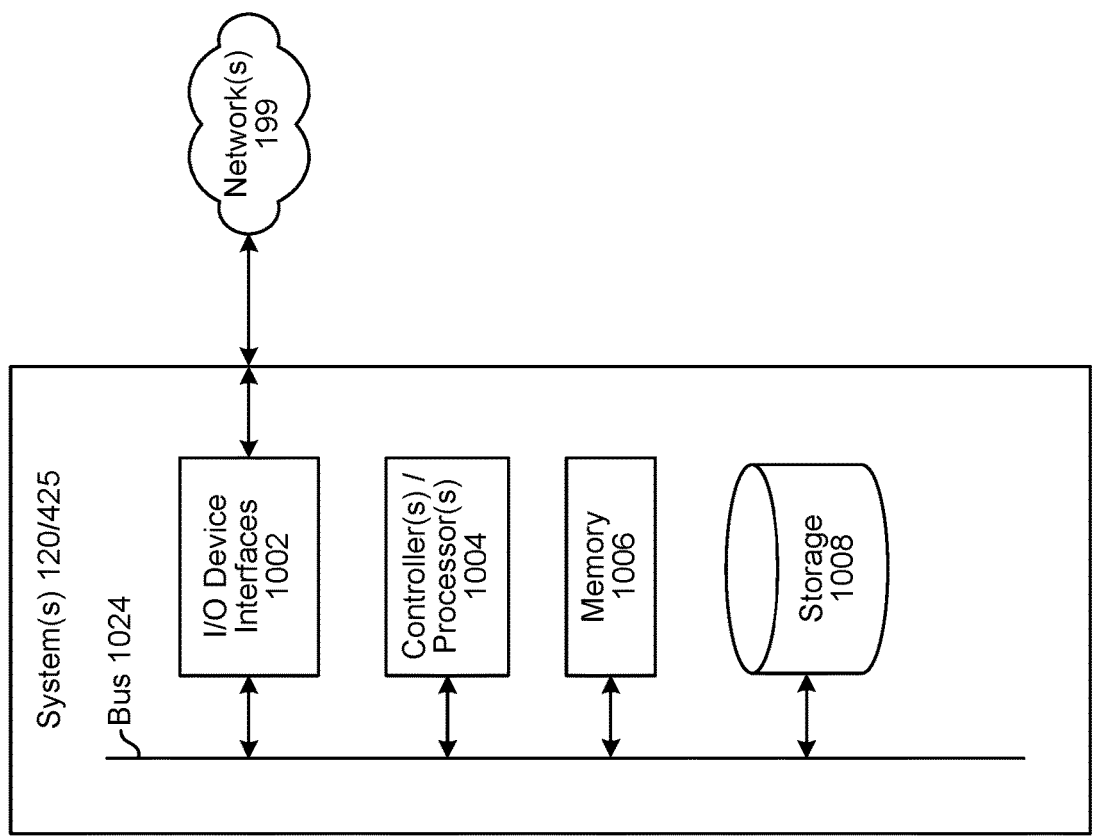
FIG. 10 is a block diagram conceptually illustrating example components of a system, according to some embodiments of the present disclosure.

FIG. 9 is a block diagram conceptually illustrating a device 110 that may be used with the system component(s) 120. FIG. 10 is a block diagram conceptually illustrating example components of a remote device, such as the system component(s) 120 or a skill 490/590. A system (120/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/425) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/425) may be included in the system 100 of the present disclosure, such as one or more systems 120 and/or one or more skills 425. In operation, each of these systems may include computer-readable and computer-executable instructions that reside on the respective device (120/425), as will be discussed further below.

Each of these devices (110/120/425) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/425) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/425) may also be connected to removable or external non-volatile memory and/or storage (such as a removable memory card, memory key drive, networked storage, etc.) through respective input/output device interfaces (902/1002).

Computer instructions for operating each device (110/120/425) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/425) includes input/output device interfaces (902/1002). A variety of components may be connected through the input/output device interfaces (902/1002), as will be discussed further below. Additionally, each device (110/120/425) may include an address/data bus (924/1024) for conveying data among components of the respective device. Each component within a device (110/120/425) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system component(s) 120, and/or the skill 490/590 may include their own dedicated processors, memory, and/or storage. Alternatively, one or more of the components of the device 110, the system component(s) 120, and/or the skill 490/590 may utilize the I/O interfaces (902/1002), processor(s) (904/1004), memory (906/1006), and/or storage (908/1008) of the device 110, the system component(s) 120, or the skill 490/590, respectively. Thus, the ASR component 450/560 may have its own I/O interface(s), processor(s), memory, and/or storage; the NLU component 460/560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill 490/590, as described herein, are illustrative, and may be located as a stand-alone device or may be included, in whole or in part, as a component of a larger device or system.

Figure 11:
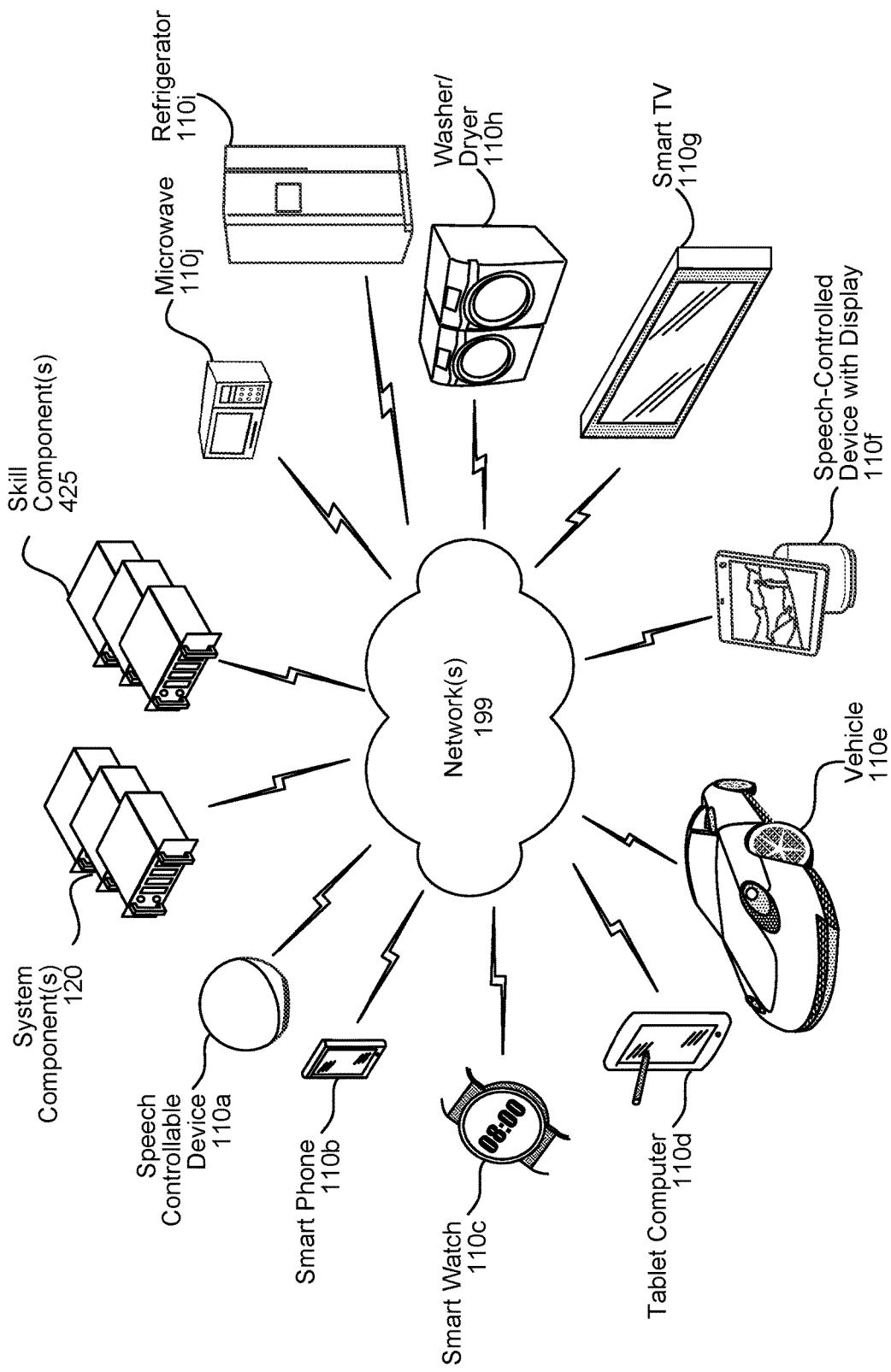
FIG. 11 illustrates an example of a computer network for use with the overall system, according to some embodiments of the present disclosure.

As illustrated in FIG. 11, multiple devices (110a-110j, 120, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system component(s) 120, the skill 425, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input data representing a first natural language user input corresponding to a first dialog between a first device and a natural language processing system;
   retrieving first dialog history data corresponding to the first dialog, the first dialog history data representing at least one previous natural language user input and at least one previous natural language system response;
   determining dialog context data including the first natural language user input and the first dialog history data;
   processing the dialog context data using a first machine learning classifier to determine:
      a first score corresponding to a first natural language dialog guideline comprising a first natural language description of a first condition in which the first natural language dialog guideline is applicable and a second natural language description corresponding to a first action to be taken,
      a second score corresponding to a second natural language dialog guideline comprising a third natural language description of a second condition in which the second natural language dialog guideline is applicable and a fourth natural language description corresponding to a second action to be taken, and
      based at least in part on the first score and the second score, that the first condition is more applicable to the dialog context data than the second condition;
   in response to the first condition being more applicable to the dialog context data than the second condition, sending first data representing text of the first natural language dialog guideline to a machine learning language generation component;
   processing, by the machine learning language generation component, the dialog context data and the first data to generate second data representing text of a first natural language system response to the first natural language user input, wherein the text corresponds to the first action; and
   causing output of the second data.

2. The computer-implemented method of claim 1, further comprising:
   processing, by a second machine learning classifier, the dialog context data, the second data, and third data representing a plurality of proposed natural language system responses to the first natural language user input, to determine:
    a third score corresponding to the first natural language system response, and
    a fourth score corresponding to a second natural language system response of the plurality of proposed natural language system responses;
determining, based at least in part on the third score and the fourth score, that the second natural language system response is a more appropriate response to first natural language user input than the first natural language system response; and
in response to the second natural language system response being a more appropriate response than the first natural language system response, causing the first device to present the second natural language system response.

3. The computer-implemented method of claim 2, further comprising:
processing the first data by at least a first component to determine the third data representing a plurality of proposed natural language system responses, wherein the first component is different from the machine learning language generation component; and
sending, from the first component to the second machine learning classifier, the third data.

4. The computer-implemented method of claim 1, wherein the first condition corresponds to a first identifier of a first skill and the computer-implemented method further comprises:
determining the at least one previous natural language user input invoked the first skill; and
including the first identifier of the first skill in the dialog context data,
wherein the first score determined by the first machine learning classifier is based at least in part on the first condition corresponding to the first identifier.

5. A computer-implemented method, comprising:
receiving first data representing a natural language input corresponding to a dialog with a natural language processing system;
determining dialog history data representing at least one previous natural language input and at least one previous natural language system response;
processing the first data and the dialog history data using a machine learning classifier to:
    identify a first natural language dialog guideline comprising a first natural language description of a first condition in which the first natural language dialog guideline is applicable and a second portion including a second natural language description corresponding to a first action to be taken,
    identify a second natural language dialog guideline comprising a third natural language description of a second condition in which the second natural language dialog guideline is applicable and a fourth natural language description corresponding to a second action to be taken, and
    determine the first condition is more applicable to the dialog history data than the second condition;
in response to the first condition being more applicable to the dialog history data than the second condition, determining, using a second machine learning component, and based at least in part on the dialog history data, the first data, and the first natural language dialog guideline, output data representing a natural language response to the natural language input; and
causing presentation of the output data.

6. The computer-implemented method of claim 5, wherein the second machine learning component comprises a language generation component and wherein determining the output data comprises generating, by the language generation component, the output data representing the natural language response.

7. The computer-implemented method of claim 5, wherein the second machine learning component comprises a selection component and wherein the computer-implemented method comprises:
receiving, by the second machine learning component and from a first component different from the second machine learning component, second data representing a plurality of proposed natural language system responses, the second data comprising at least the output data,
wherein determining the output data comprises selecting, by the selection component, the output data from among the second data.

8. The computer-implemented method of claim 7, wherein the first component corresponds to a first skill and the computer-implemented method further comprises:
determining the dialog corresponds to the first skill; and
sending, to the first component, the first data,
wherein the second data is sent by the first component in response to the first data.

9. The computer-implemented method of claim 7, further comprising:
generating, using a third machine learning component, and based at least in part on the dialog history data, the first data, and the first natural language dialog guideline, third data representing a second natural language response to the natural language input,
wherein determining the output data comprises selecting, by the selection component, the output data from among the second data and the third data.

10. The computer-implemented method of claim 5, wherein the first condition corresponds to a first identifier of a first skill and the computer-implemented method further comprises:
determining the at least one previous natural language input invoked the first skill; and
including the first identifier of the first skill in the dialog history data,
wherein determining the first condition is more applicable to the dialog history data than the second condition is based at least in part on the dialog history data including the first identifier.

11. The computer-implemented method of claim 5, wherein the natural language input was received by a first device and the computer-implemented method further comprises:
determining the dialog corresponds to a first user profile;
determining, using the first user profile, second data representing a portion of a previous dialog corresponding to the first user profile and a second device different from the first device; and
including, in the dialog history data, the second data.

12. The computer-implemented method of claim 5, further comprising:
determining a sentiment of the natural language input,
wherein determining the first condition is more applicable to the dialog history data than the second condition is further based at least in part on the sentiment.

13. A system, comprising:

at least one processor; and at least one memory comprising instructions that, when executed by the at least one processor, cause the system to:

receive first data representing a natural language input corresponding to a dialog with a natural language processing system;

determine dialog history data representing at least one previous natural language input and at least one previous natural language system response;

process the first data and the dialog history data using a machine learning classifier to:

identify a first natural language dialog guideline comprising a first natural language description of a first condition in which the first natural language dialog guideline is applicable and a second portion including a second natural language description corresponding to a first action to be taken, identify a second natural language dialog guideline comprising a third natural language description of a second condition in which the second natural language dialog guideline is applicable and a fourth natural language description corresponding to a second action to be taken, and determine the first condition is more applicable to the dialog history data than the second condition;

in response to the first condition being more applicable to the dialog history data than the second condition, determine, using a second machine learning component, and based at least in part on the dialog history data, the first data, and the first natural language dialog guideline, output data representing a natural language response to the natural language input; and cause presentation of the output data.

14. The system of claim 13, wherein the second machine learning component comprises a language generation component and wherein the instructions that cause the system to determine the output data comprise instructions that, when executed by the at least one processor, cause the system to generate, by the language generation component, the output data representing the natural language response.

15. The system of claim 13, wherein the second machine learning component comprises a selection component and wherein the at least one memory further comprises instructions that, when executed by the at least one processor, cause the system to:

receive, by the second machine learning component and from a first component different from the second machine learning component, second data representing a plurality of proposed natural language system responses, the second data comprising at least the output data, wherein the instructions that cause the system to determine the output data comprise instructions that, when executed by the at least one processor, cause the system to select, by the selection component, the output data from among the second data.

16. The system of claim 15, wherein the first component corresponds to a first skill and wherein the at least one memory further comprises instructions that, when executed by the at least one processor, cause the system to:

determine the dialog corresponds to the first skill; and send, to the first component, the first data, wherein the second data is sent by the first component in response to the first data.

17. The system of claim 15, wherein the at least one memory further comprises instructions that, when executed by the at least one processor, cause the system to:

generate, using a third machine learning component, and based at least in part on the dialog history data, the first data, and the first natural language dialog guideline, third data representing a second natural language response to the natural language input, wherein the instructions that cause the system to determine the output data comprise instructions that, when executed by the at least one processor, cause the system to select, by the selection component, the output data from among the second data and the third data.

18. The system of claim 13, wherein the first condition corresponds to a first identifier of a first skill and wherein the at least one memory further comprises instructions that, when executed by the at least one processor, cause the system to:

determine the at least one previous natural language input invoked the first skill; and include the first identifier of the first skill in the dialog history data, wherein determining the first condition is more applicable to the dialog history data than the second condition is based at least in part on the dialog history data including the first identifier.

19. The system of claim 13, wherein the natural language input was received by a first device and wherein the at least one memory further comprises instructions that, when executed by the at least one processor, cause the system to:

determine the dialog corresponds to a first user profile;

determine, using the first user profile, second data representing a portion of a previous dialog corresponding to the first user profile and a second device different from the first device; and include, in the dialog history data, the second data.

20. The system of claim 13, wherein the at least one memory further comprises instructions that, when executed by the at least one processor, cause the system to:

determine a sentiment of the natural language input, wherein determining the first condition is more applicable to the dialog history data than the second condition is further based at least in part on the sentiment.

* * * * *